United States Patent
Djinki et al.

(10) Patent No.: US 9,474,068 B2
(45) Date of Patent: Oct. 18, 2016

(54) STORYTELLING SIMULATOR AND DEVICE COMMUNICATION

(71) Applicant: Disney Enterprises, Inc., Burbank, CA (US)

(72) Inventors: Pierre Djinki, Renton, WA (US); James Hite, Bothell, WA (US); Edward S. Lowe, Jr., Seattle, WA (US); Derek Simkowiak, Lynnwood, WA (US)

(73) Assignee: Disney Enterprises, Inc., Burbank, CA (US)

( * ) Notice: Subject to any disclaimer, the term of this patent is extended or adjusted under 35 U.S.C. 154(b) by 85 days.

(21) Appl. No.: 14/486,296

(22) Filed: Sep. 15, 2014

(65) Prior Publication Data

US 2015/0078232 A1   Mar. 19, 2015

Related U.S. Application Data

(60) Provisional application No. 61/878,365, filed on Sep. 16, 2013, provisional application No. 61/878,348, filed on Sep. 16, 2013.

(51) Int. Cl.
| | |
|---|---|
| H04W 72/04 | (2009.01) |
| H04W 74/02 | (2009.01) |
| H04W 52/02 | (2009.01) |
| H04W 4/00 | (2009.01) |
| G09B 5/00 | (2006.01) |
| G09B 7/00 | (2006.01) |

(52) U.S. Cl.
CPC ......... *H04W 72/0446* (2013.01); *H04W 4/008* (2013.01); *H04W 52/0216* (2013.01); *H04W 74/02* (2013.01); *G09B 5/00* (2013.01); *G09B 7/00* (2013.01); *Y02B 60/50* (2013.01)

(58) Field of Classification Search
CPC .......... H04W 72/02; H04W 72/0446; H04W 52/0216; H04W 4/008
See application file for complete search history.

(56) References Cited

U.S. PATENT DOCUMENTS

| | | | |
|---|---|---|---|
| 7,246,315 B1 | 7/2007 | Andrieu et al. | |
| 9,253,774 B2 * | 2/2016 | Lim ................. | H04W 72/0446 |
| 2003/0063619 A1 * | 4/2003 | Montano .......... | H04L 29/12009 370/443 |
| 2008/0013498 A1 * | 1/2008 | Sugaya ............... | H04W 16/14 370/337 |

(Continued)

FOREIGN PATENT DOCUMENTS

WO    WO 2012/153917 A2 * 11/2012

OTHER PUBLICATIONS

Fontijn, et al., "StoryToy the Interactive Storytelling Toy", 3rd International Conference on Pervasive Computing, 2005, 6 pages.

*Primary Examiner* — Redentor Pasia
(74) *Attorney, Agent, or Firm* — Patterson + Sheridan, LLP

(57) ABSTRACT

Embodiments provide techniques for facilitating radio frequency (RF) communication between devices using guaranteed time slots (GTSs). Embodiments include designating, at a personal area network (PAN) coordinator, a contention access period (CAP) during which a plurality of devices on a network can transmit unsolicited media access control (MAC) commands to the PAN coordinator via RF communications. Embodiments further include facilitating direct RF communication between the plurality of devices, by broadcasting a beacon, at the PAN coordinator, designating GTSs for the plurality of devices, wherein each GTS specifies a time period during which one of the plurality of devices on the network is authorized to send or receive data.

19 Claims, 13 Drawing Sheets

(56) References Cited

U.S. PATENT DOCUMENTS

| | | |
|---|---|---|
| 2009/0088142 A1 | 4/2009 | Baribault et al. |
| 2009/0161622 A1* | 6/2009 | Sugaya .............. H04W 48/12 370/329 |
| 2009/0238160 A1* | 9/2009 | Bhatti ................ H04L 1/1614 370/338 |
| 2010/0195601 A1* | 8/2010 | Zhang ................ H04W 74/04 370/329 |
| 2011/0314381 A1 | 12/2011 | Fuller et al. |
| 2012/0155349 A1* | 6/2012 | Bajic .................. H04W 4/008 370/311 |
| 2012/0157197 A1 | 6/2012 | Watkins, Jr. et al. |
| 2013/0329690 A1* | 12/2013 | Kim ................ H04W 36/0072 370/329 |
| 2014/0064252 A1* | 3/2014 | Lim .................. H04W 72/048 370/331 |
| 2014/0080109 A1 | 3/2014 | Haseltine et al. |
| 2014/0126558 A1* | 5/2014 | Kim ................... H04W 74/04 370/336 |
| 2014/0192696 A1* | 7/2014 | Wang ............... H04W 72/1252 370/311 |
| 2015/0079573 A1 | 3/2015 | Haseltine et al. |

* cited by examiner

US 9,474,068 B2

STORYTELLING SIMULATOR AND DEVICE COMMUNICATION

CROSS-REFERENCE TO RELATED APPLICATIONS

This application claims benefit of U.S. provisional patent application Ser. No. 61/878,365, filed Sep. 16, 2013, and Ser. No. 61/878,348, also filed Sep. 16, 2013, which are both herein incorporated by reference in their entirety.

BACKGROUND

1. Field of the Invention

The present invention generally relates to home entertainment, and more specifically to techniques for providing an immersive playtime environment using interactive devices.

2. Description of the Related Art

Computer graphics technology has come a long way since video games were first developed. Relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Additionally, many hand-held gaming devices include some form of camera device which may be used to capture an image or a series of images of a physical, real-world scene. The captured images can then be displayed, for instance, on a display of the hand-held gaming device. Certain devices may be configured to insert virtual objects into the captured images before the images are displayed. Additionally, other devices or applications may enable users to draw or paint particular within a captured image of a physical scene. However, as such alterations apply only to a single image of the physical scene, subsequent captured images of the physical scene from different perspectives may not incorporate the user's alterations.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Generally, embodiments presented herein provide techniques to create an immersive storytelling environment using one or more storytelling devices (also referred to as interactive devices). More specifically, embodiments may use various storytelling devices, each capable of producing some auditory and/or visual effect, to create an immersive and interactive storytelling experience for a user. Such a system may include a plurality of storytelling devices and a controller, interconnected via a network (e.g., an RF communications network). Here, each of the storytelling devices generally represent any device that is capable of making a contribution to a storytelling experience, responsive to some form of stimulus and a current context of a story. For instance, the controller device could configure each of the storytelling devices with stimulus and response information, based on a current context of a story. As an example, the controller device could configure a particular storytelling device to take a certain audiovisual action responsive to a certain stimulus event (e.g., a user performing a particular action), and to perform another audiovisual action responsive to another stimulus event (e.g., the user not performing the particular action within a predefined window of time). Generally, the controller may be one of the plurality of storytelling devices, or the controller could be a standalone device (e.g., a computing device executing a control application).

Storytelling Environment

Figure 1:
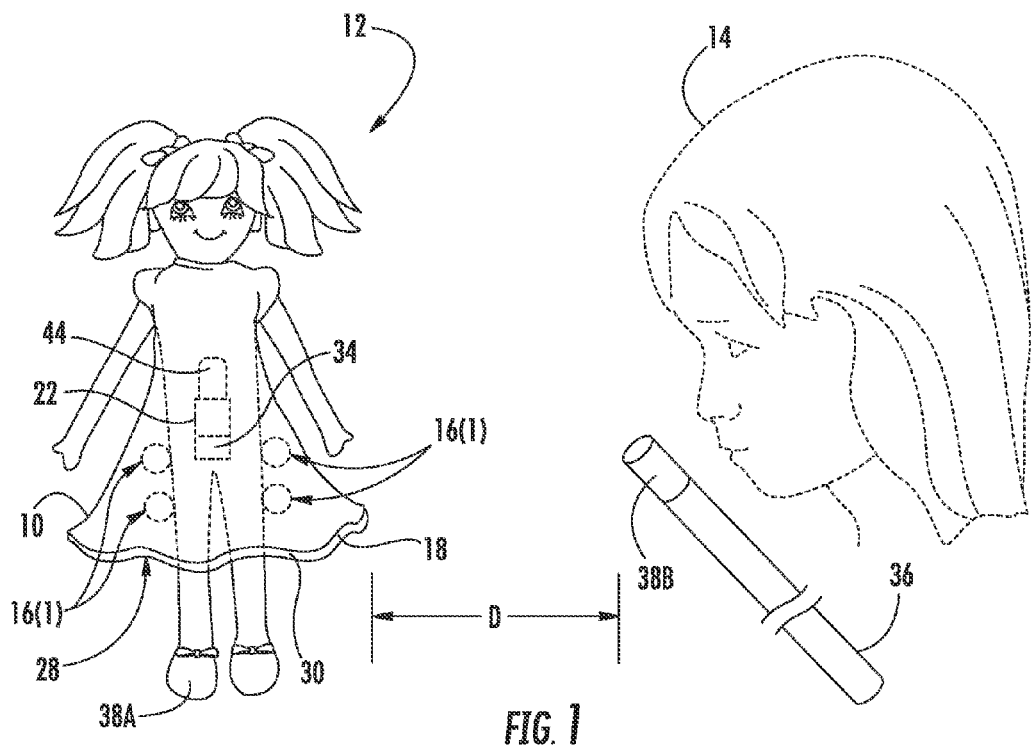
FIG. 1 is a schematic drawing of an exemplary doll having a color-changeable dress with an exemplary light source disposed within an outer material of the dress, the doll is proximate to an exemplary control object in the form of a wand in possession of a user.
Figure 2:
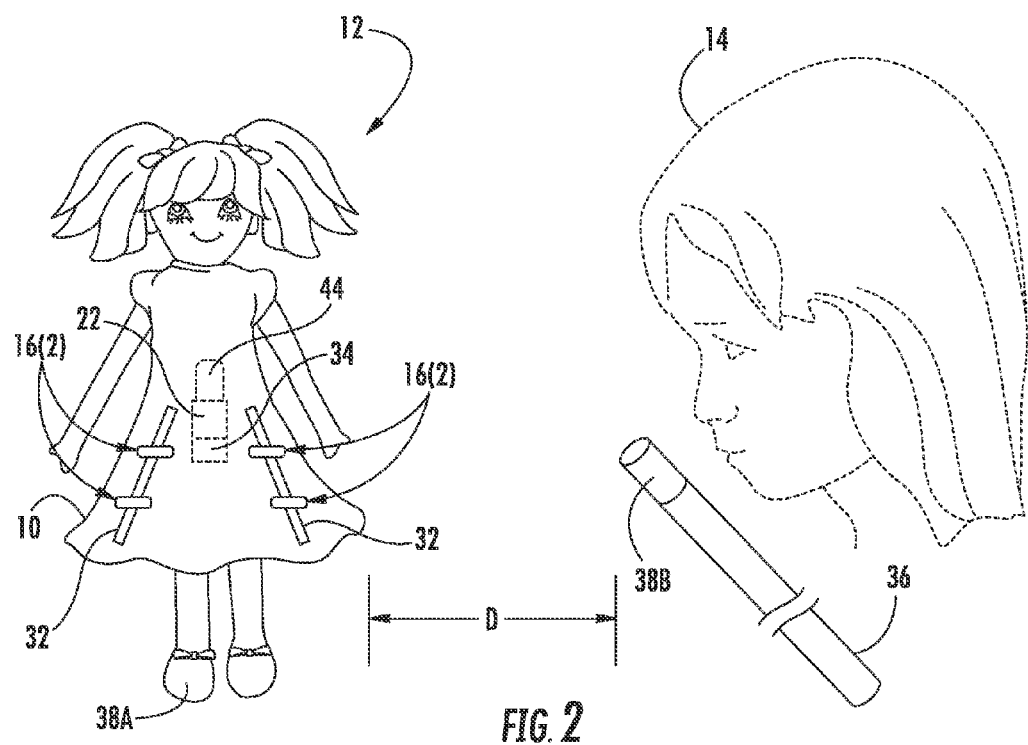
FIG. 2 is a schematic drawing of an exemplary doll having a different embodiment of a color-changeable dress with a different embodiment of a light source mounted on mounting material disposed outside the outer material of the dress, and the doll is proximate to the control object in the possession of the user.
Figure 3:
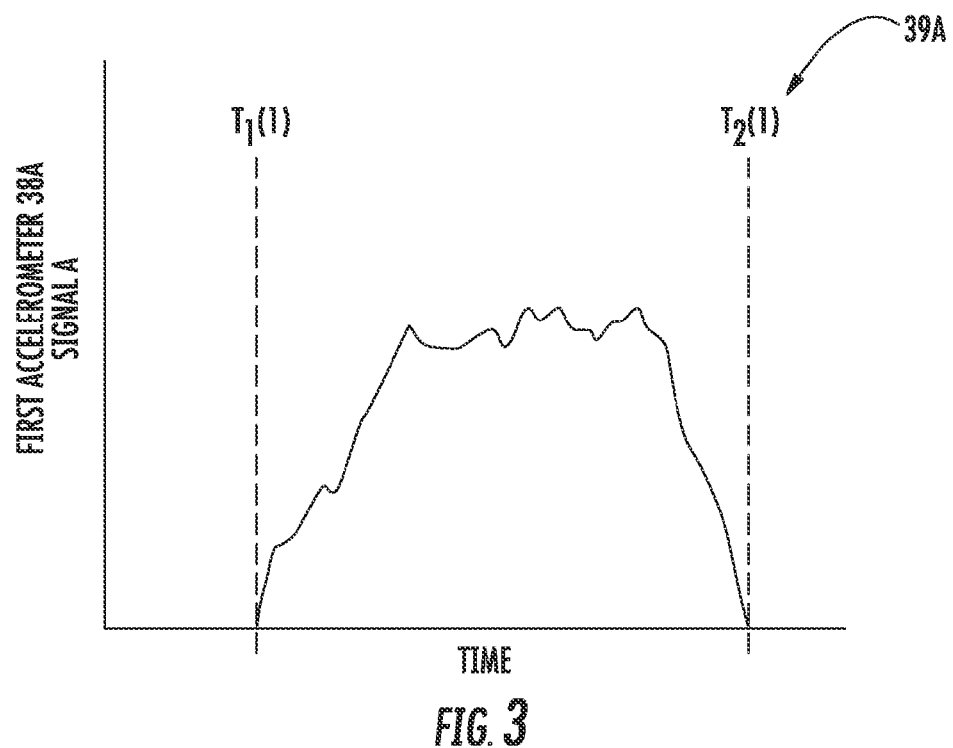
FIGS. 3 and 4 are electronic signatures, respectively, of a first accelerometer attached as part of the doll of FIG. 2 and a second accelerometer attached as part of the control object of FIG. 2.
Figure 4:
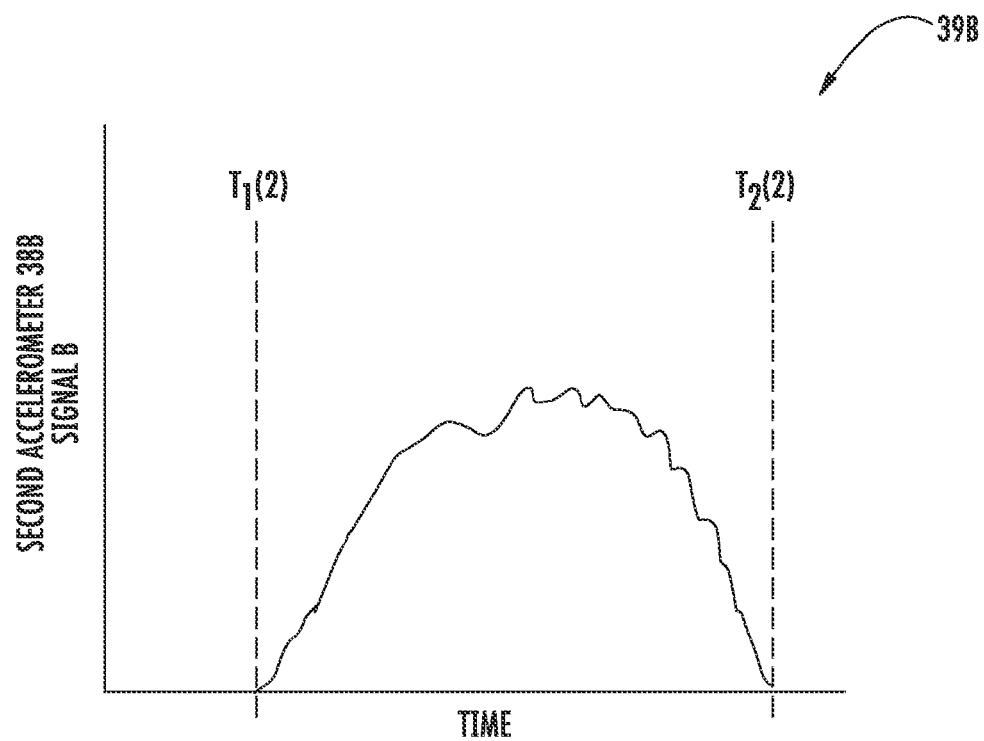
Figure 5:
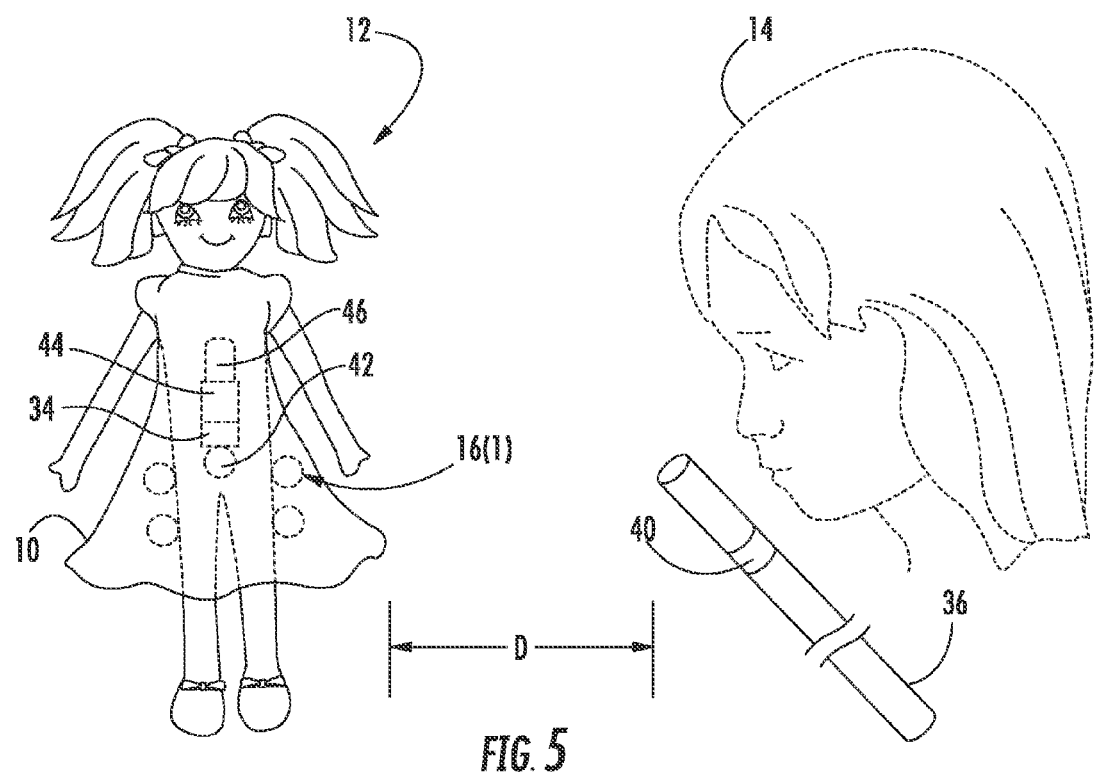
FIG. 5 is a schematic drawing of a different embodiment of an exemplary doll having the color-changeable dress of FIG. 1, illustrating an approach to measure proximity by including an emitter as part of a control object and a receiver as part of the doll to measure strength of the signal from the emitter.
Figure 6:
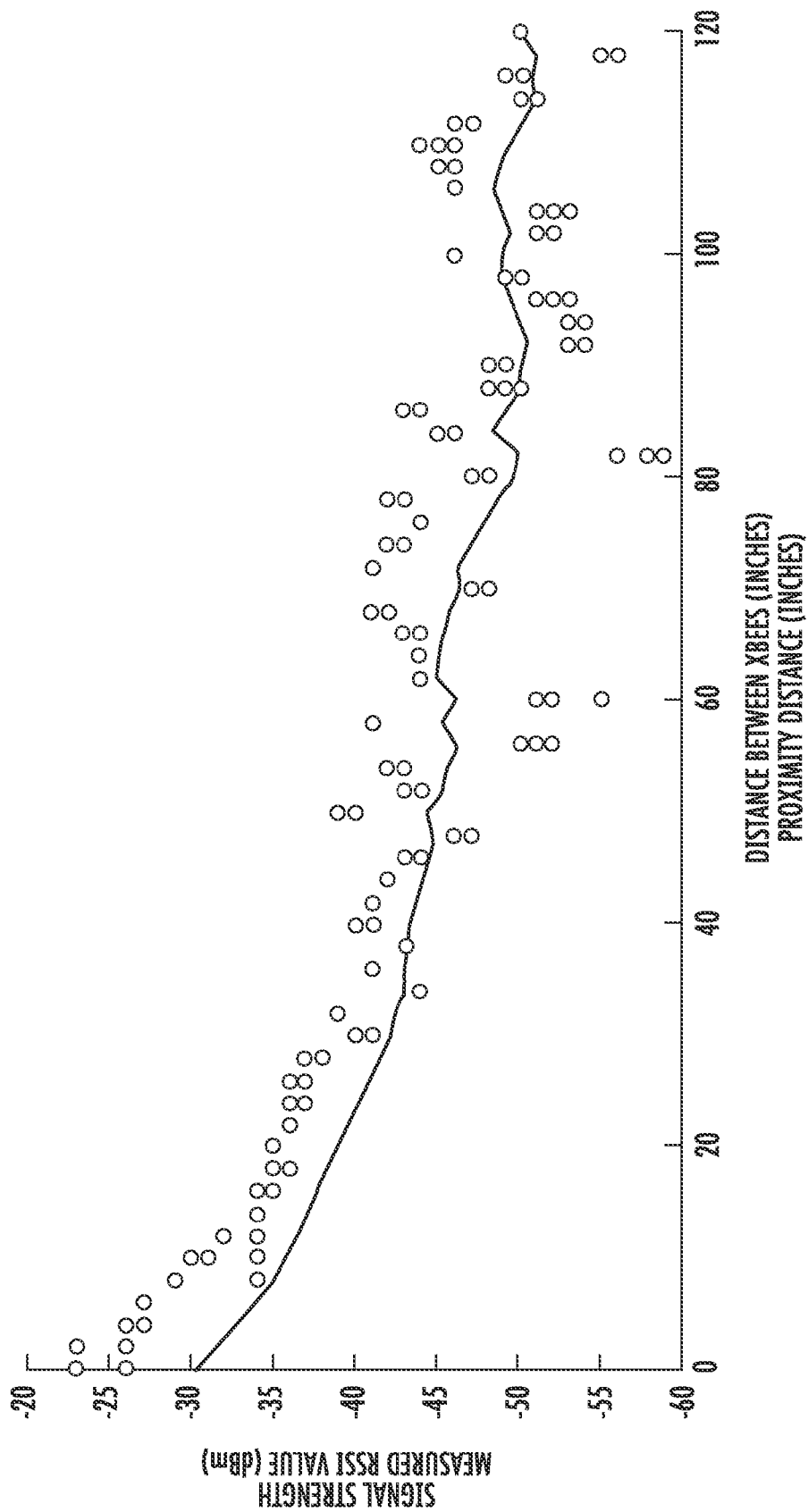
FIG. 6 is a graph showing signal strength of the signal emitted from the emitter of FIG. 5 as a function of proximity or distance between the doll and the control object in a clutter-free environment.
Figure 7:
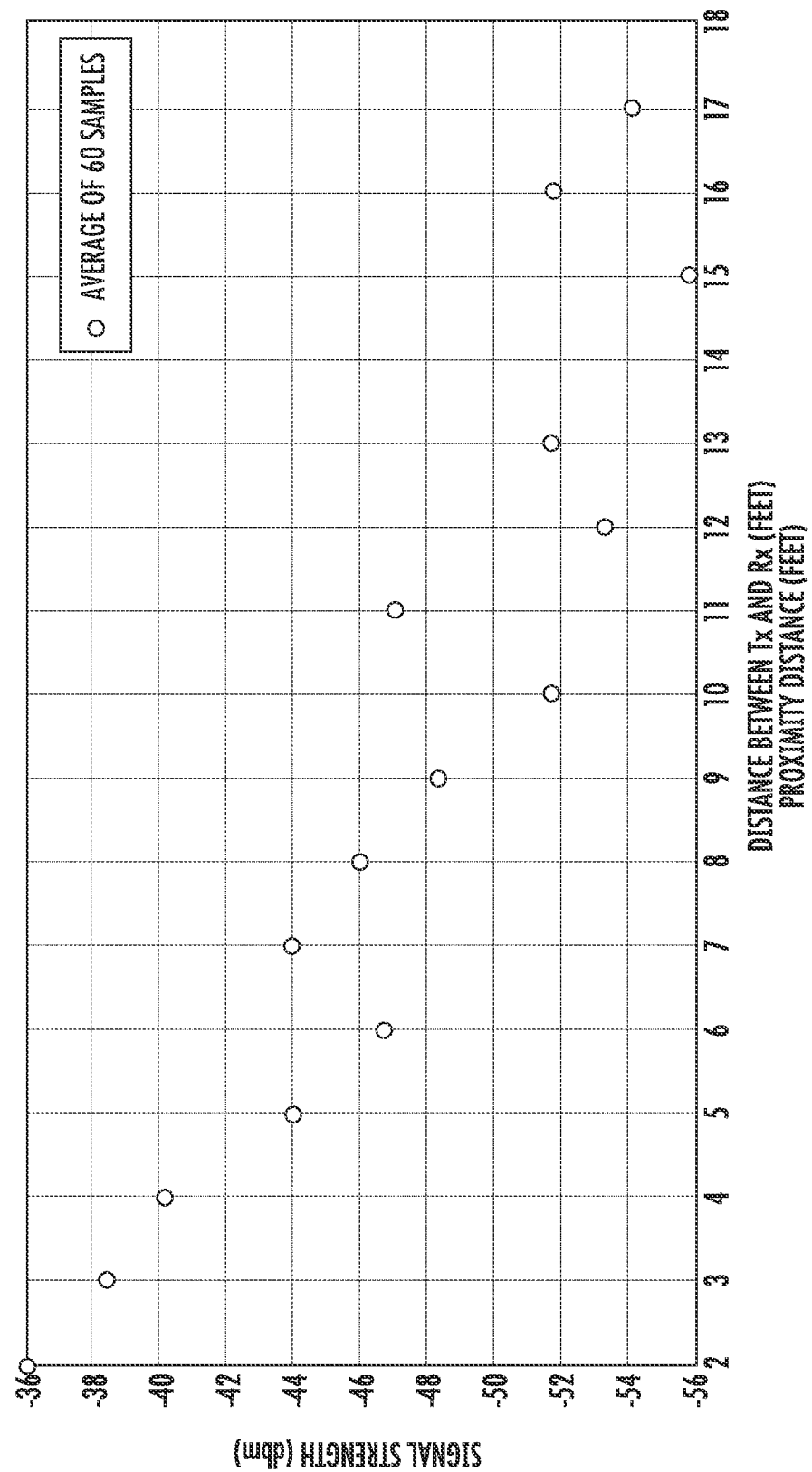
FIG. 7 is a graph showing signal strength of the signal emitted from the emitter of FIG. 5 as a function of proximity or distance between the doll and the control object in a cluttered environment without a line of sight between the receiver and the emitter.
Figure 8:
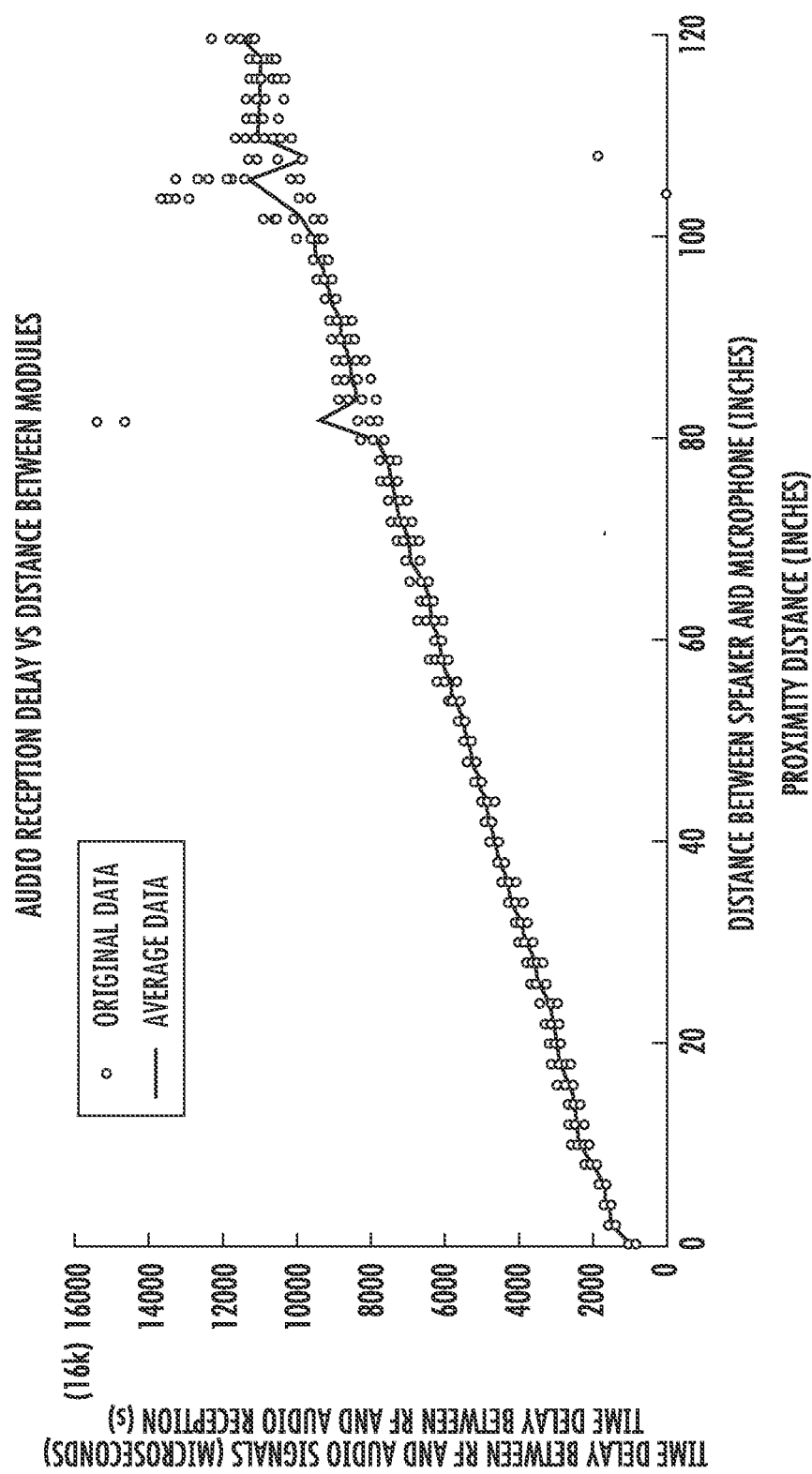
FIG. 8 is a graph showing a time delay versus distance between an RF signal and an audio signal travelling from the control object to the doll.
Figure 9:
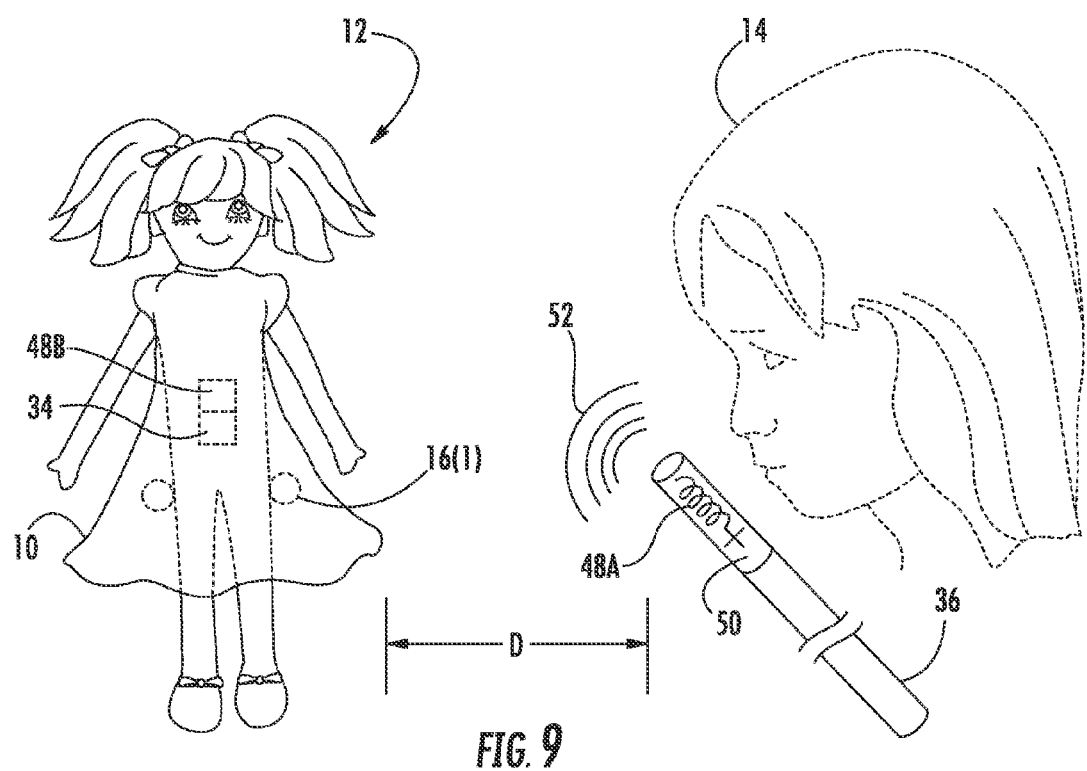
FIG. 9 is a schematic drawing of a different embodiment of an exemplary doll having a color-changeable dress comprising a light source electrically connected to a second induction coil, wherein the second induction coil may be responsive to a first inductor of the control object when the control object in a form of a wand is disposed near the color-changeable dress.
Figure 10:
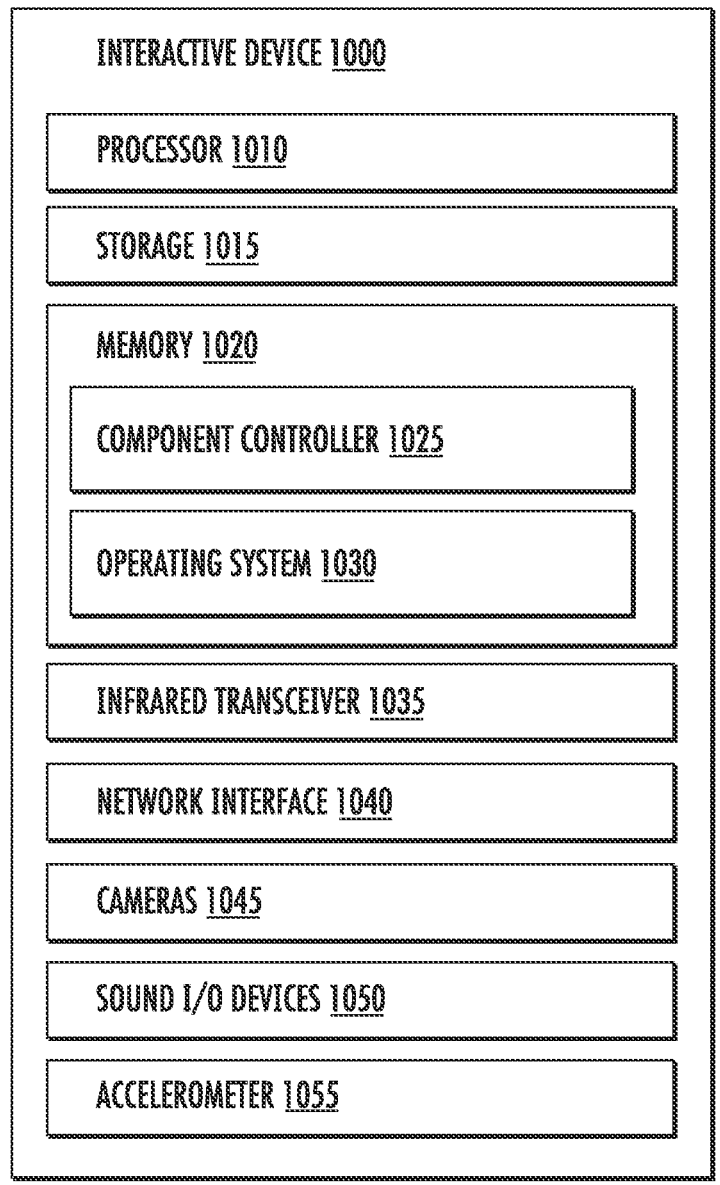
FIG. 10 is a block diagram illustrating an interactive device which can be adapted to serve in either the doll or the control object as illustrated in previous drawings.
Figure 11:
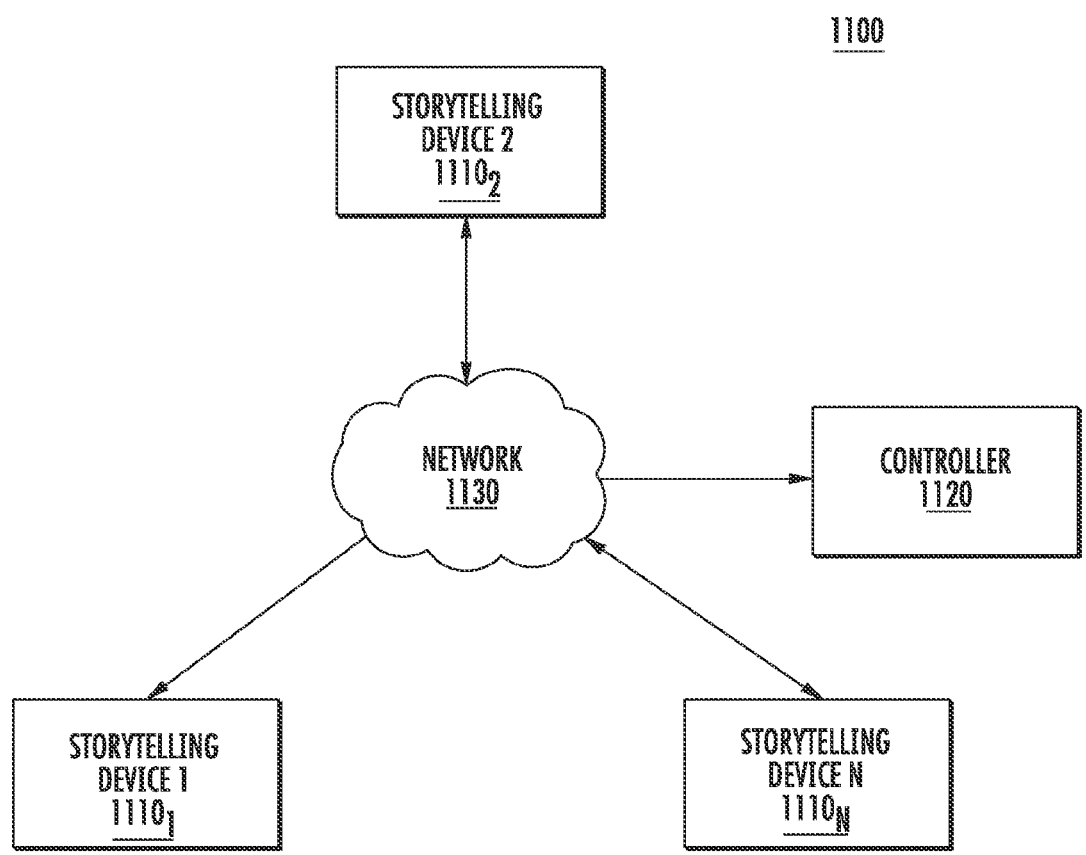
FIG. 11 is a system for providing a storytelling experience, according to one embodiment described herein.

Generally, embodiments provide techniques for creating an immersive storytelling environment using one or more storytelling devices. More specifically, embodiments may use various storytelling devices, each capable of producing some auditory and/or visual effect, to create an immersive and interactive storytelling experience for a user. An example of this can be seen in FIG. 11, which is a block diagram illustrating a storytelling environment including a plurality of storytelling devices. The system 1100 includes a plurality of storytelling devices $1110_{1-N}$ and a controller 1120, interconnected via a network 1130. Here, each of the storytelling devices $1110_{1-N}$ generally represent any device that is capable of making a contribution to a storytelling experience, responsive to some form of stimulus and a current context of a story. For instance, the controller device 1120 could configure each of the storytelling devices $1110_{1-N}$ with stimulus and response information, based on a current context of a story. As an example, the controller device 1120 could configure a particular storytelling device to take a certain audiovisual action responsive to a certain stimulus event (e.g., a user performing a particular action), and to perform another audiovisual action responsive to another stimulus event (e.g., the user not performing the particular action within a predefined window of time).

When a user initiates the immersive storytelling experience for a particular story, the controller device 1120 could detect all the storytelling devices $1110_{1-N}$ available in the user's physical environment (e.g., in the room of the user's house where the user is currently standing). Additionally, the controller device 1120 could determine which of the available storytelling devices $1110_{1-N}$ are compatible with the particular story. Once the compatible storytelling devices $1110_{1-N}$ are identified, the controller device 1120 could initiate the immersive storytelling experience for the user, using the identified storytelling devices $1110_{1-N}$.

As mentioned above, the controller device 1120 could configure each of the storytelling devices $1110_{1-N}$ to perform certain actions in response to a detected stimulus event and a current context of the story being told. Here, the story may include a number of different contexts in a temporal order, and the playback of the story may advance from one context to the next until the last context is reached and the storytelling experience is complete. However, while the story may be linear in progression, this is not necessarily the case. For example, one embodiment provides a story having one or more branches, where the story can proceed down one of a plurality of different arcs. For instance, one of the arcs could be selected based on a selection algorithm (e.g., randomly selecting one of the arcs), a user's request (e.g., the user specifying which arc should be taken), the user's actions (e.g., the user manages to "rescue" one of the fictional characters in the story), the user's history of actions (e.g., whether the user is trending towards the "dark side" in a Star Wars® storyline), and so on. Moreover, the story may be modified dynamically during playback based on various actions, such as one of the storytelling devices becoming unavailable (e.g., losing power, leaving the physical environment, etc.) or a new storytelling device being introduced to the environment (e.g., the user's friend comes over to play, bringing one or more new storytelling devices with him).

For example, a storytelling device could be in the shape of a magic lamp, and the stimulus event could be a user action within a physical environment in which the storytelling device is located (e.g., a user rubbing a surface of the magic lamp device). As another example, the stimulus event could be an action performed by another one of the storytelling devices. To perform the action(s) responsive to the detected stimulus event, the magic lamp device could be configured to project (i.e., using one or more projectors within the lamp or otherwise present within the physical environment) a depiction of a genie above the lamp. For instance, the depiction could be a virtual or real image projection that creates the appearance (or illusion) of a real or holographic image existing in and interacting with the physical world. Additionally, the magic lamp device could include an auditory device(s) (e.g., a speaker, resonant cavities, etc.) capable of playing sounds. For instance, the magic lamp device could use the auditory device(s) to play sounds synchronized with the projection of the genie depicting the genie's voice.

As part of the storytelling experience, the storytelling devices $1110_{1-N}$ may appear to interact with one another and the user, using various input/output components. Continuing the above example of a magic lamp device, the device could be configured with a vibration mechanism (e.g., a gear coupled to an off-center weight), such that the magic lamp could appear to shake while the genie is "locked" inside the lamp. The lamp could also include a touch-sensitive surface that could be used to detect when the user rubs on the lamp. As an example, the lamp could appear to shake and rattle on the table, and could play sound effects depicting the genie asking the user to "Let me out of here!" The lamp could then detect when the user rubs on the side of the lamp with the user's hand (i.e., an occurrence of a stimulus event) and, in response, could project the holographic depiction of the genie above the lamp. The holographic genie projection could then thank the user for freeing him from the lamp (i.e., an action performed responsive to the occurrence of the stimulus event), and the story could continue.

Throughout the storytelling experience, portions of the story may require some action by the user before the story will continue. As an example, the storytelling device could require that the user find a particular object (e.g., a magic talisman) before the story can continue. Such an object could be, for instance, a physical object that was previously hidden in the physical environment (e.g., by the user's parent or guardian) or could be a virtual object seen with an augmented reality device. The storytelling device (or a controller device) could determine the hidden object's real-world position within the physical environment, for example, by receiving global positioning system (GPS) corresponding to the hidden object (e.g., determined by and received directly from the hidden object itself, received from a controller device, etc.) and by determining GPS coordinates associated with the storytelling device. The storytelling device (or a controller device) could then use the two sets of GPS coordinates to determine the hidden object's position relative to the storytelling device. The storytelling device (or a controller device) could further determine the user's position relative to the storytelling device (e.g., using GPS coordinates associated with the user, based on images captured using one or more cameras of the storytelling device, etc.), and from these two relative positions, could determine the hidden object's position relative to the user. As the user gets closer to the object, the storytelling device (or a controller device) could monitor the user's position and provide guidance to help the user find the object. For instance, as the user gets closer to the object, the storytelling device could inform the user that the user is getting "hotter", and as the user gets further from the object, the storytelling device could inform the user that he is getting "colder."

In one embodiment, the user may be given a choice between multiple different actions, and the action the user chooses may influence the outcome of the story. That is, depending on which action the user chooses, the controller device 1120 could configure the storytelling devices 1110$_{1-N}$ differently, based on a corresponding storyline arc of the story. In such an example, when advancing from one context of the story to the next, the controller device 1120 could select one of a plurality of next contexts to advance to, based on the stimulus event detected. For instance, once the user finds the magic talisman, the genie could inform the user that the power of the talisman may be used to stop an evil plan of the story's antagonist, or that the talisman could be destroyed in order to stop the antagonist's plot. The user may then inform the genie (e.g., with a verbal statement detected with one or more microphones) of the user's choice, and the controller 1120 could advance the story a next context corresponding to the user's choice and could configure the storytelling devices 1110$_{1-N}$ accordingly, allowing the remainder of the story to play out differently depending on the path chosen by the user.

Generally, the storytelling devices 1110$_{1-N}$ can interact visually with the user as part of the storytelling experience. For instance, using the example above of a magic lamp storytelling device, storytelling device could track the user's position (e.g., using one or more boresighted cameras within the device—i.e., a camera configured to view the area that a projector is configured to project onto) and could project the depiction of the genie (e.g., using image projection techniques creating the appearance of real or holographic images within the real world) such that the genie appears to follow the user around the room as the user searches for the magic talisman. The storytelling device could also use the user's position to cause the projected genie to face the user when speaking to the user, helping to enhance the realism of the storytelling experience. The genie could be rendered as exasperated or frustrated when the user gets further away from the hidden talisman, and could be rendered as encouraging or cheering the user on as the user gets closer to the talisman.

In one embodiment, one of the storytelling devices 1110$_{1-N}$ is configured with an audio device(s) capable of localized sound (i.e., sound that appears to emit from the storytelling device), non-localized sound (i.e., sound where it is difficult to determine the input direction), or both. Generally speaking, localized sound may come from speakers producing mid- and high-range frequencies, while non-localized sound may come from speakers producing low-range frequencies. More generally, it is broadly contemplated that any techniques, known or unknown, for producing localized sound and/or non-localized sound may be used consistent with the present disclosure.

Embodiments may use localized sound and non-localized sound (e.g., sounds of different frequencies) to create particular effects in the immersive storytelling environment. For instance, while the genie is "locked" in the lamp, the lamp device could project sound depicting the genie's voice using localized sound, so that the genie's voice appears to be coming from the lamp. On the other hand, when the user is invoking the power of the magic talisman, the lamp could project sound effects for the talisman using non-localized sound, so that the sound effects appear to be coming from all around the user. Advantageously, by altering the perceived location of the sound source, embodiments may create a more immersive and enhanced storytelling experience.

The storytelling device could then use the image and voice/sound recognition features to provide personalized, context-aware storytelling. Additionally, such recognition features can greatly simplify the user's task of setting up and maintaining the storytelling system. Such setup automation could be used to effectively render the setup of a complex, multi-element storytelling environment fun and simple for the user. For example, image recognition technology could be used in conjunction with geolocation systems to automatically tell the storytelling device to tailor the story content to a child's bedroom (e.g., versus the family room), obviating the need for a user to manually tell the storytelling device where it is located and what other storytelling devices are in the immediate environment.

Additionally, as discussed above, the storytelling devices 1110$_{1-N}$ may interact with one another in creating the immersive storytelling experience. For instance, the storytelling device 1110$_1$ could be a mechanized stuffed animal (e.g., a monkey) capable of performing gestures and other movements (as well as auditory expressions) in response to particular stimuli. For instance, the mechanized monkey stuffed animal 1110$_1$ could be capable of walking around using its legs (and potentially its arms as well), and could be capable of moving its arms, legs, head and torso in various ways, giving the appearance of various gestures and facial expressions. In the present example, the mechanized monkey device 1110$_1$ could track the user's movement around the physical environment (e.g., using one or more cameras) and could follow the user around the room as the user searches for the magic talisman. In doing so, the device 1110$_1$ and/or the controller device 1120 could track the device's 1110$_1$ position as well as the position of the magic talisman device. The monkey stuffed animal 1110$_1$ could also be configured to perform actions responsive to detecting an occurrence of a stimulus event, in order to give hints to the user (e.g., upon detecting that the user has been searching for the hidden object for longer than a threshold amount of time). For instance, if after 120 seconds the user has not found the hidden talisman, the monkey stuffed animal 1110$_1$ could begin jumping up and down, pointing in the direction of the hidden talisman, and making noises to attract the attention of the user.

Generally, it is broadly contemplated that a storytelling device may react differently to a given stimulus event, based on a current context of the story, and the controller 1120 may configure the storytelling devices 1110$_{1-N}$ to recognize different stimulus events and to perform different actions in response, as the story plays out. For instance, in the above example, the monkey stuffed animal device could be configured to react in fear of the genie when the genie first appears (i.e., a first stimulus event at a first context within the story). However, at a later point in the story where the genie comes to the user's aid, the monkey device could be configured to react gratefully (i.e., a second stimulus event at a second context within the story). As another example, the magic lamp storytelling device (e.g., the storytelling device $1110_2$) could be configured to react in a particular way when the user first rubs the lamp (e.g., by displaying a holographic image of the genie appearing above the lamp), but could react in a different way (or not at all) in a different part of the story. Advantageously, doing so allows the storytelling devices to react in a realistic and expected fashion, depending on a current context of the story.

The controller 1120 generally contains logic for managing the storytelling experience. This may include, for instance, managing the actions of the various storytelling devices $1110_{1-N}$ and coordinating how the storytelling devices $1110_{1-N}$ interact with one another and with the user based on the current context of the story. For instance, the controller 1120 could transmit, to each of the storytelling devices $1110_{1-N}$, data defining the actions and corresponding stimuli that the respective device should use as part of the storytelling experience. For instance, such data may specify, without limitation, one or more frames to project, where to project such frames, auditory sounds to play, a frequency at which to play the sounds (e.g., localized versus non-localized sound), and a movement action (e.g., walking, gesturing, vibrating, etc.). In such an embodiment, each storytelling devices $1110_{1-N}$ could only contain data relating to its own individual actions, rather than the entirety of the story and the actions and stimuli involved in the story. The devices $1110_{1-N}$ could then perform the specified actions in response to detecting the corresponding stimuli, thereby creating the immersive storytelling environment.

Generally, a variety of different stimuli (also referred to herein as stimulus events) may be used in accordance with embodiments described herein. For instance, one stimuli could be a visual stimuli detected using one or more cameras within a storytelling device 1110. As an example, the storytelling device 1110 could monitor a user's position as the user walks around the room by capturing different images of the room using several different cameras positioned at different angles. The storytelling device 1110 could then make contextually-appropriate comments to the user, based on the user's determined position. For instance, as the user gets further away from a hidden object that the storytelling device 1110 knows the location of (e.g., based on a comparison between a GPS coordinates received from the hidden object and GPS coordinates determined for the storytelling device 1110), the storytelling device 1110 could comment (e.g., by emitting sound from one or more speakers) that the user is getting "colder" in his search for the hidden object.

Another example of a stimulus is an action taken by another one of the storytelling devices 1110. For instance, when the user rubs the magic lamp device and the projection of the genie appears, the monkey stuffed animal device could emit a frightened noise (e.g., "Eek!") and could cover its eyes with its hands. The occurrence of the action by the other storytelling device 1110 could be conveyed in a number of ways. For instance, the monkey device could detect that the genie projection has appeared, by analyzing images captured using one or more cameras.

As another example, the magic lamp device could be configured to transmit a signal to the monkey device, indicating that the genie projection action has been performed. The monkey device could then react to the genie's appearance, based on the received signal. As discussed above, the action performed responsive to the detected stimulus event may depend on a current context of the story being told. That is, while the monkey device may react in fright when the genie first appears (i.e., a first context within the story), the monkey device may react in relief later in the story when the genie comes to the user's aid against the antagonist of the story (i.e., a second context within the story).

In a particular embodiment, rather than transmitting a signal directly to the other storytelling devices, the magic lamp device could transmit the signal to the controller 1120, and the controller 1120 could determine which, if any, other storytelling devices 1110 need to be made aware of the occurrence of the event. That is, a centralized model could be employed where each storytelling device communicates with the controller 1120, rather than a peer-to-peer model in which each storytelling device communicates directly with the other storytelling devices. For instance, the controller could maintain data specifying which storytelling devices 1110 are capable (in the context of a given story) of reacting to a particular stimulus event. Upon receiving a signal indicating that a particular action has been performed, the controller 1120 could use such data to determine which device(s) should react to the event and informs those device(s) of the occurrence of the event. In one embodiment, the controller 1120 may select a subset of the devices capable of reacting to the event, and may inform only the selected devices of the occurrence of the event. For example, if the controller 1120 determines that six different storytelling devices 1110 present in the physical environment (e.g., the user's room) are capable of reacting to the appearance of the genie, the controller 1120 may determine a subset of these devices to react to the genie's appearance. Such a subset could be selected, for instance, based on a priority value associated with each device's 1110 response action to the stimuli. In one embodiment, the devices 1110 to react to the stimuli are selected randomly (or pseudo-randomly).

The controller 1120 may also determine, for each available device 1110 capable of reacting to the event, whether the device 1110 should perform the entirety of its responsive actions in reacting to the event. That is, the controller 1120 could specify that certain available devices 1110 should only perform a portion of their responsive actions, in response to the detected stimuli. For instance, assume that the controller 1120 determines that there are six different storytelling devices 1110 present in the physical environment that are capable of reacting to the appearance of the genie, and that all six devices 1110 have both an auditory and a physical reaction to the genie's appearance. Here, the controller 1120 could select a sub-set of the devices 1110 (e.g., only the monkey device) to react in an auditory fashion, but could determine that all six of the devices 1110 should perform their physical reaction to the genie's appearance. Advantageously, doing so helps to ensure that all available storytelling devices 1110 capable of doing so will react to the stimuli in some form, while making sure that the storytelling devices 1110 do not "talk over" each other, making each device's auditory contribution difficult to understand.

Generally, the controller 1120 may be implemented in a number of different ways. In one embodiment, the controller 1120 resides within one of the storytelling devices $1110_{1-N}$. One advantage to such an embodiment is that no additional setup on the user's part may be required before the storytelling experience begins. That is, the user could purchase the storytelling device containing the controller 1120, and when the user activates the storytelling device (e.g., by powering it on), the controller 1120 could detect what other storytelling devices 1110$_{1-N}$ are present within the user's home (e.g., through wireless communications) and could automatically adapt the storytelling experience accordingly. However, from the user's experience, the user merely powers the device containing the controller 1120 on and the story begins.

In a particular embodiment, the controller 1120 comprises software executes on a computing device. For example, the user could download a software application on a personal computing device or tablet computing device that, when executed, serves as the controller 1120. Such an embodiment may require the user to download or install a software application before beginning the storytelling experience. However, one advantage to using software on a personal computer as the controller 1120 is that the software application can take advantage of the processing power of the user's personal computer, thereby avoiding any additional cost of adding separate controller logic to one of the storytelling devices 1110$_{1-N}$.

Generally, the controller 1120 may maintain data related to a multitude of different stories. For each story, the controller 1120 could maintain data specifying a list of storytelling devices 1110 that are compatible with the story, and may maintain a respective set of actions and corresponding stimulus events for each compatible device. Additionally, some stories may include different branches, in which the story can play out in different ways depending on the choices a user makes and/or the actions the user takes.

For instance, the stories are provided to the controller 1120 as they are released (e.g., the controller 1120 could automatically download the newly released stories from a remote website). In a particular embodiment, stories associated with a particular storytelling device may be automatically unlocked when the user purchases and registers such a storytelling device with a content server. In one embodiment, the controller 1120 is configured to download only stories that the user has purchased. For instance, the user could maintain an account with the remote story server (e.g., a website). If the user selects a given story for playback, the controller 1120 could query the remote website to determine whether the user has already purchased the selected story, based on the user's account with the website. If the user has already purchased the story, the controller 1120 could begin interactively telling the story using the available storytelling devices. If the user has not yet purchased the story, the controller 1120 could prompt the user as to whether the user wishes to purchase the story.

In one embodiment, the controller 1120 is configured to automatically purchase the story on the user's behalf when the user selects a story he has not yet purchased. In a particular embodiment, the stories are provided to the user using a subscription model. That is, the user could periodically pay a subscription fee (e.g., monthly) and new stories could be periodically released on the remote website. So long as the user's subscription is paid, the controller 1120 could automatically download the new stories from the remote website, so that the new stories are ready for playback when the user next wishes to use the storytelling device(s).

In one embodiment, users may purchase alternate actions, behaviors and/or dialogue options for their storytelling devices. Generally, it is completed that any content associated with the storytelling experience may be locked or unlocked in various ways and for various reasons, consistent with the functionality herein. For instance, content (e.g., stories, behaviors, dialogue, etc.) may be unlocked based on the user's previous actions in the storytelling environment. For instance, in a Star Wars® themed storytelling environment, the controller 1120 could unlock various Sith-themed stories if the user is trending towards the "dark side", based on the user's past actions in previously played stories.

More generally, it is contemplated that any revenue model, known or unknown, may be employed in the distribution of stories. Exemplary revenue models include, but are not limited to, a pay-per-use model (e.g., a fee is assessed each time the user plays through a story), a micropayment model (e.g., chapters within a single story could be purchased individually, special characters within a single story could be unlocked using digital currency, etc.), virtual good purchases (e.g., special items which influence the playback of a story could be unlocked, either with a purely virtual currency and/or a digital currency linked to real currency, etc.), advertising models (e.g., targeted product placement within the context of a given story, an advertisement depicted using visual and/or audible playback from a storytelling device(s), etc.) and a viral marketing model (e.g., a story could be unlocked for users who transmit advertising and/or purchasing opportunities to one another).

In one embodiment, a physical item can be used to unlock digital (and/or virtual) content. For instance, a plastic chip could be provided (e.g., for sale at retail stores) that is configured to plug into a particular slot on one of the storytelling devices. As an example, an electronic or electromechanical (e.g., a key with particularly arranged slots) could be plugged in to one of the storytelling devices to unlock content. The controller 1120 could detect when the chip has been plugged into one of the storytelling devices and could further detect a type of the chip (e.g., based on data specified on a memory within the chip, based on the construction and/or shape of the chip, etc.). The controller 1120 could then unlock content corresponding to the detected type for use by the user. For example, such content could include a new storyline that can be played out by the storytelling device having the chip, and the controller 1120 could download such a storyline (e.g., from a remote server) responsive to the chip being inserted into the storytelling device. As another example, the unlocked content could include new behaviors and/or dialogue for the storytelling device. More generally, it is broadly contemplated that any content can be unlocked by the physical device, consistent with the functionality herein.

Additionally, the physical object or device need not plug into or otherwise physically connect with the storytelling device in order to unlock content. For example, the storytelling device could receive a signal (e.g., an RF or RFID signal) that indicates particular content should be unlocked. As an example, a signal could be broadcast at a particular Star Wars®-themed attraction at a theme park, and any Star Wars®-themed storytelling device receiving the signal could be configured to unlock particular content in response. As an example, a new storyline could be unlocked upon receipt of the signal. As another example, the storytelling device could perform certain actions (e.g., gestures, dialogue, etc.) in response to receiving the signal.

Moreover, it is broadly contemplated that stories may be provided by any number of parties. For example, in one embodiment, a single story developer controls the creation, production, and release of stories onto the market for the storytelling system. In another embodiment, a marketplace could be provided in which developers, retailers, users and hobbyists can work collectively to create and distribute custom stories to other various users. Such custom stories could be distributed free of charge or could be distributed using any pricing model, known or unknown, consistent with the present disclosure. Additionally, the marketplace could be moderated to ensure the distributed stories are content-appropriate. For example, moderators could assign ratings to individual stories (e.g., ratings similar to Motion Picture Association of America ratings for films) and users could be informed of these ratings before viewing a particular story. In such an embodiment, particular users (e.g., children) may be restricted from viewing stories with certain ratings. In one embodiment, moderators may only allow "approved" stories onto the market place. For instance, moderators could only approve youth-appropriate stories for distribution, thereby insuring that any and all content distributed on the marketplace is appropriate for users of all ages.

Generally speaking, the storytelling devices 1110 and the controller 1120 may be stateful devices. That is, these devices $1110_{1-N}$ and 1120 may maintain state data relating to a current playback position within a given story, and this state data may be maintained when if the user suspends playback of the story. Thus, the user could pause the interactive playback of a particular story at some playback position (e.g., 120 minutes into the story), and when the user next initiates the playback of the particular story, the playback could resume at approximately the previous playback position (e.g., exactly at the previous playback position, slightly before the previous playback position, slightly after the previous playback position, etc.).

Additionally, such state data may specify particular events that have occurred (e.g., interactions with a user) and could be used to improve the storytelling experience for the user. For instance, a virtual character (e.g., projected into the physical world, shown on an augmented reality device, etc.) could be configured with a variety of different phrases that can be used in reacting to a given stimulus event. In such an embodiment, a storytelling device 1110 associated with the virtual character could maintain state data specifying which of the phrases the virtual character has used recently, and could avoid using these recently used phrases in responding to subsequent occurrences of the stimulus event. Advantageously, doing so helps to ensure the dialogue between the virtual characters and the user is repetitive, and does not become stale or repetitive. Other state data could relate to, for example, customer relationship management (CRM) services and other personalization features, such as remembering the user's name, remembering the state of a room, remembering past activities and interactions occurring between a storytelling device(s) and a user(s), and likely or predicted future needs and desires for the user(s).

In one embodiment, an augmented reality device is used as one of the storytelling devices 1110. As used herein, an augmented reality device refers to any device capable of displaying a real-time view of a physical, real-world environment or elements of a physical, real-world environment, while altering elements within the displayed view of the environment. As such, unlike a virtual reality device which displays a view of virtual world, an augmented reality device displays a view of the real world but augments elements using computer graphics technology. More generally, however, the augmented reality devices and the storytelling devices 1110 can work to create a high-level form of augmented reality. For instance, by projecting images of virtual characters into the physical world to create the appearance of a three-dimensional holographic image, embodiments are able to augment the appearance of the physical world itself as perceived by the user, thereby creating a new form of augmented reality for the user.

For instance, continuing the aforementioned example of a user searching for a magic talisman hidden within his room, the user could search for the talisman using an augmented reality device. As an example, the user could walk around his room, viewing the room with the augmented reality device, and software on the augmented reality device could be configured to augment the displayed scene to include the augmented reality device, when a specific location of the user's room is viewed. Additionally, the depiction of the magic talisman on the display of the augmented reality device could appear to respond to interactions from the user. For instance, the augmented reality device could detect the appearance of the user's hand within captured visual scene (e.g., frames captured using a camera(s) of the augmented reality device) and could manipulated the appearance of the magic talisman within the display, such that it appears the user is touching and physically moving the virtual talisman. As an example, the user could reach out and grasp at the depicted location of the virtual talisman, and the augmented reality device could augment the depiction of the user's hand on the augmented reality device's display, such that it appears the user is holding the talisman in his hand. The user could then walk around his room carrying the talisman (as shown on the augmented reality device).

Storytelling Simulator

As the number of storytelling devices available continues to grow, it becomes increasingly difficult to author and test new storylines, as the story author would need to maintain an increasing library of physical storytelling devices. Moreover, such testing may become increasingly time-consuming as the number of storytelling devices grows. For example, a particular story may attribute actions to the role of "Marvel® Hero", which could include a substantial number of storytelling devices pertaining to different Marvel® comic heroes, and may even include multiple devices for each hero (e.g., multiple different Iron Man® action figure storytelling devices produced by the same manufacturer or by different manufacturers). While each of these toys may implement some common application programming interface (API) and/or communications protocol for communicating with other storytelling devices, each of these devices may perform different actions (e.g., visual effects, movements, sound effects, etc.) and ideally should be tested with each story to ensure proper performance. As such, testing a newly created storyline with each available storytelling device may become increasingly difficult as the number of storytelling devices grows, and testing each story with every possible permutation of storytelling devices may quickly become infeasible.

As such, one embodiment provides a storytelling experience simulator for use in testing stories through the use of one or more virtual storytelling devices. For instance, a virtual Iron Man® action figure storytelling device could be created within the simulator and a particular story could be played out using the virtual storytelling device. That is, the virtual Iron Man® storytelling device could be configured to interact with other virtual storytelling devices created within the simulator, and/or could interact with one or more physical storytelling devices, as part of the storytelling experience. The virtual Iron Man® device could be configured to execute the same logic (e.g., computer program code) as the corresponding physical Iron Man® device executes, so as to ensure the virtual device behaves in the same fashion as the physical device. Doing so allows a newly created story to be tested, without requiring any or all of the physical storytelling devices involved in the playthrough of the story to be present.

Figure 12:
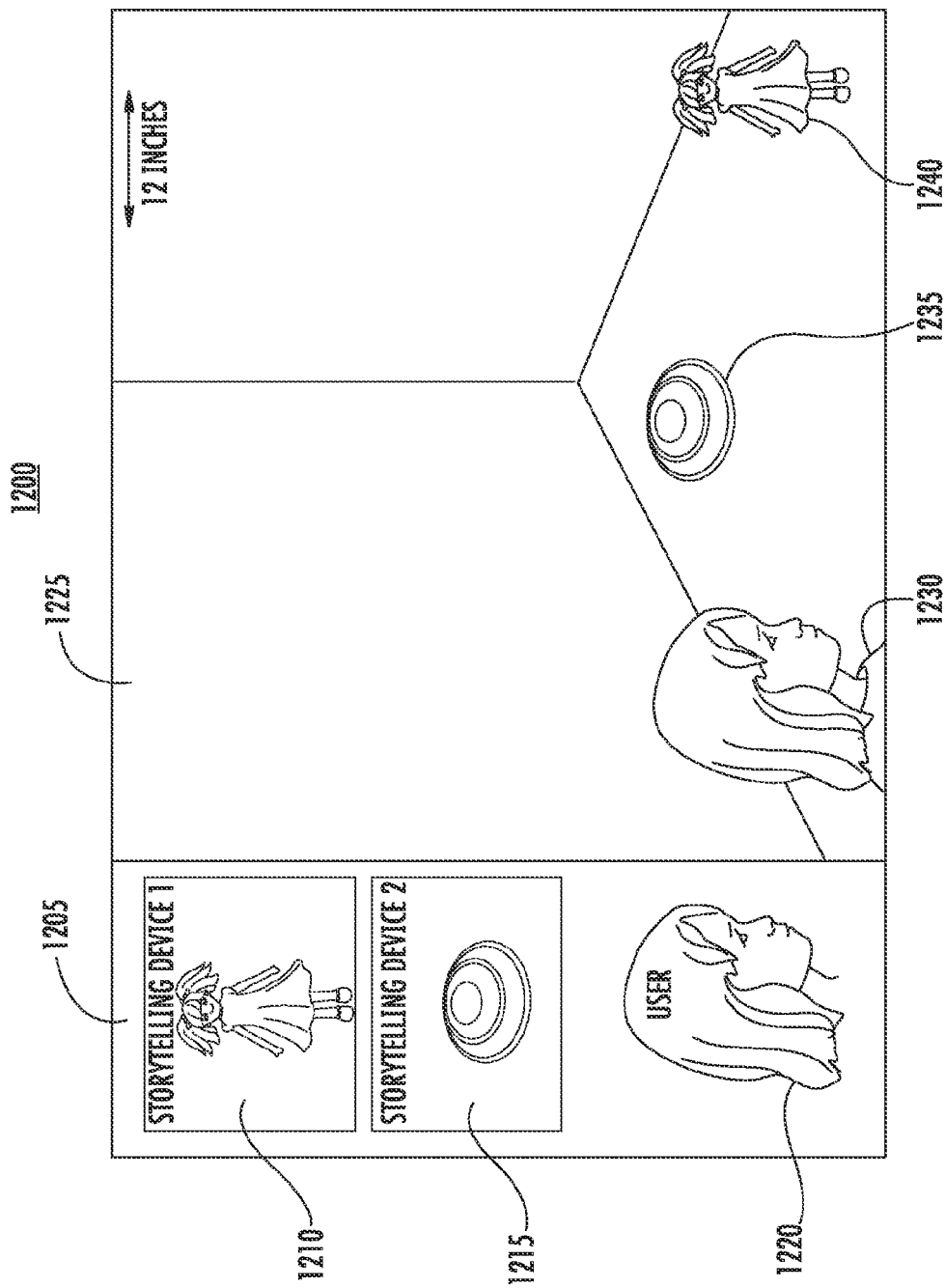
FIG. 12 is an interface for a storytelling simulator application, according to one embodiment described herein.

As an example, the simulator application could provide an interface, depicting a physical environment (e.g., a room of a house) and could enable a user to insert virtual storytelling devices throughout the room of the house (e.g., by dragging and dropping the virtual devices onto locations within the room). An example of this is shown in FIG. 12, which shows an interface 1200 that includes a storytelling device selection panel 1205 and a virtual environment panel 1225. The storytelling device selection panel 1205 includes storytelling devices 1210 and 1215 and a user icon 1220. In the depicted example, the storytelling devices 1210 and 1215 have been inserted into the virtual environment 1225 as virtual devices 1240 and 1235, respectively. Moreover, the user icon 1220 has been inserted into the virtual environment 1225 as the virtual user 1230.

The simulator application could playback the story using the virtual devices, and could update the interface to show behaviors of the virtual devices as appropriate throughout the playback of the story. For this example, assume the action figure storytelling device 1210 (and virtual device 1240) represent an Iron Man® action figure, and that the storytelling device 1215 (and the virtual device 1235) represent a Captain America's® shield storytelling device. Here, the devices 1210 and 1215 could be used to play out a story in which a user learns to use the shield 1215, and practices deflecting repulsor ray blasts from the Iron Man® device. However, as the story is played out using the virtual devices 1235 and 1240, the virtual Iron Man® action FIG. 1240 could appear to light up when firing its repulsor ray, much in the way the corresponding physical Iron Man® action figure would light up (e.g., using light emitting diodes (LED) within the physical toy). Moreover, the simulator application could output audio effects (e.g., through speakers of a computer system executing the simulator application) when one of the virtual storytelling devices outputs an audio effect as part of the story (e.g., dialogue from the Iron Man® action figure that would, in the physical action figure, be output using one or more speaker devices of the physical action figure storytelling device). Advantageously, doing so enables users (e.g., content developers) to see how the story will play out using the storytelling devices inserted into the interface, and may allow the user to identify any problems or errors with the newly created story, without requiring any physical storytelling devices to be present.

In some embodiments, a storytelling device may perform an action based in part on the device's position within the physical environment and/or based on the position of another entity within the physical environment (e.g., another storytelling device, the user, etc.). As such, the simulator application could configure the virtual devices to treat their location within the virtual environment as their physical location for purposes of performing such actions. As an example, an Iron Man® action figure could be configured to fire repulsor rays (e.g., using coded infrared signals) at other storytelling devices or at the user, and game logic (e.g., managed by a controller device) could be configured to consider the repulsor rays effective only if fired within 5 feet from their target. For instance, if the Iron Man® action figure fires the repulsor ray at a Hulk® action figure that is 6 feet away, the repulsor ray may not register as a "hit" on the Hulk® action figure, but would register the ray as a hit if fired from, e.g., 3 feet away. In the context of the simulator application, the simulator may be configured to determine a distance between two virtual devices within the virtual environment, and to use this determined distance as part of the storytelling experience.

Thus, in the present example, game logic could make use of the determined distance between the virtual devices 1235 and 1240 within the virtual environment 1225 (rather than the distance between any physical storytelling devices) for purposes of determining whether the repulsor ray is fired sufficiently close to its target to be effective. In addition, the simulator application could enable the user to move virtual storytelling devices within the interface, which in turn could trigger stimulus events (e.g., a proximity alert) within the context of the current story. Doing so allows the simulator application to accurately model a physical environment, without requiring any physical storytelling devices to be present.

In addition to inserting virtual devices into the simulated environment at various positions, the simulator may enable (e.g., via the interface) users to insert an "end user" into the virtual environment. That is, particular storytelling devices may perform certain actions responsive to or based on an end user's presence and/or position within the physical environment and, as such, the simulator may model this by including a virtual end user within the virtual environment. In the interface 1200, the end user is represented by the virtual user 1230 within the virtual environment 1225, and has been inserted into the virtual environment 1225 by a user dragging the icon 1220 into the virtual environment 1225 at the depicted position.

Generally speaking, storytelling devices may be configured to consider a user's position in detecting or reacting to stimulus events. For instance, one of the storytelling devices could be configured to detect the user's position (e.g., using one or more camera devices) and to rotate the device's head and eyes in the direction of the user, when initiating dialogue with the user. In such an example, the virtual storytelling device could perform the same behavior, based on the virtual user's 1230 virtual position within the simulated environment 1225. Thus, in this example, the interface of the simulation application could depict the virtual storytelling device 1240 turning its head to face the virtual user 1230 within the virtual environment 1225.

As discussed above, storytelling devices may use hardware devices such as cameras, accelerometers, microphones, and so on to detect occurrences of stimulus events within their environment. In one embodiment, the simulation application is configured to associate a hardware device (e.g., a microphone) with one of the virtual storytelling devices, for purposes of providing input data to the virtual device. For example, a particular storytelling device could be configured to perform a particular action (e.g., a light show could be triggered on a magic lamp storytelling device) responsive to a user speaking the word "abracadabra." Continuing the example, a physical microphone device (e.g., a mobile device including a microphone device) could be tied to the virtual storytelling device, such that the physical microphone device provides input data to the virtual storytelling device. Thus, a user could speak the word "abracadabra" into the physical microphone device, which could in turn forward sound data to the simulator for further processing. The simulator could then process the sound data from the physical microphone using the logic of the virtual storytelling device. For instance, the virtual storytelling device be depicted within the interface as performing a particular action (e.g., triggering a light show), responsive to the user speaking the word "abracadabra" into the physical microphone device. While the above example relates to microphone input, a virtual storytelling device may be configured to receive and react to input data from any type of physical device (or multiple physical devices). Advantageously, doing so allows users to test the virtual storytelling devices while using actual input data produced from physical devices.

Additionally, an interface could be provided for simulating the input data for the virtual storytelling devices. For instance, an interface could include elements (e.g., buttons) corresponding to a number of different stimulus events, and a user could select one of the elements in order to simulate an occurrence of the respective stimulus event within the virtual environment. As an example, the interface could include a particular element with the textual description of "User rubs magic lamp", and upon selection of the particular element, the simulation application could transmit a signal to a magic lamp virtual storytelling device, simulating the occurrence of a stimulus event (i.e., the user physically rubbing the magic lamp device). Advantageously, doing so allows content creators to quickly test their stories with a variety of storytelling devices, and to view how the story plays out via the interface depicting the virtual environment.

In one embodiment, a web server (e.g., hosting one or more web pages and/or web applications) is configured to provide input data and signals for the virtual storytelling devices. Additionally, the web socket server may enable applications (or plug-ins) to connect and provide the input data. For instance, an application could run on a mobile device and could leverage input devices (e.g., an accelerometer) of the mobile device to provide input for the virtual storytelling devices (e.g., via the web socket server, which in turn routes the input data to an associated storytelling device). More generally, however, the simulator application may be configured to simulate any event or specific input data (e.g., a particular reading for an accelerometer) for the virtual storytelling devices within the simulated environment.

Additionally, physical storytelling devices may interact with the virtual storytelling devices within the simulated environment. For example, a physical Iron Man® action figure could be associated with a virtual Iron Man® storytelling device within the simulated environment and could provide input data to the virtual storytelling device (e.g., using microphones, cameras, accelerometers, etc. on the physical storytelling device). In such an embodiment, the physical storytelling device may be configured to perform actions responsive to simulated stimulus events within the virtual environment, and may do so based on the corresponding virtual storytelling device. For example, one storyline may configure the Iron Man® storytelling device to automatically fire his repulsor rays, responsive to moving a certain distance from a Doctor Doom® action figure (i.e., a particular stimulus event). Upon detecting that the virtual Iron Man® storytelling device has come within the certain distance of a virtual Doctor Doom® storytelling device, the simulator application may transmit data (e.g., one or more commands) to the physical Iron Man® action figure, indicating that the particular stimulus event has occurred. The physical action figure could then perform the corresponding action, firing its repulsor rays. Advantageously, doing so enables physical storytelling devices to be tested with a particular storyline, while using virtual storytelling devices for the other actors in the story.

In one embodiment, the storytelling devices are configured to collect analytics information and to report this analytics information (e.g., to a development environment) for use in monitoring the story playback experience in the aggregate. For example, a particular story could contain a branch where a user is asked to select between two storyline arcs, and the storytelling devices and/or controller devices could report information regarding which arc the user chose. A story developer could then determine that a particular arc was selected the vast majority of the time, and could use this information to enhance the development of future stories. In some cases, the analytics information may be used to detect problems within a story. For example, a particular arc could be selected more frequently due to an error in the selection logic. As another example, if the analytical data indicates that a story designed to take 40 minutes is typically completed in less than 5 minutes, this could indicate that a problem exists with the story. Additionally, the storytelling devices could be configured to report other information such as user metadata, according to a privacy policy established for the storytelling device. By reporting the analytics information, embodiments enable content producers to determine how their story content is being used and potentially how the content may be improved as well.

Additionally, the simulation application could collect and report analytics information for stories being played out in the simulation environment. Developers could then use such information to ensure they are adequately testing all aspects of the story they are created. For example, the analytics information could indicate how long each playthrough of the story lasted through completion, and how often each storyline arc within the story was taken. In one embodiment, a development application could identify (e.g., using color coding) which aspects of the story were tested (e.g., played through in a physical environment or within a simulation environment), and potentially how frequently each aspect was tested as well. For instance, a development application could display a textual and/or graphical representation of the story, where a first section of the story could be colored in green indicating the section has been played through a substantial number of times, a second section is colored in yellow indicating the section has been played through a moderate number of times, and a third section could be colored in red indicating that the section has never been played through. The developer could then use this information to determine that the third section still needs substantial testing. Advantageously, doing so helps to improve the story development process and to ensure that all aspects of the story have been tested.

Intra-Device Communication

In one embodiment, the storytelling devices are configured to communicate with one another through the use of radio frequency (RF) communications, using a protocol based on the IEEE 802.15.4 protocol. Generally, the IEEE 802.15.4 protocol includes a personal area network (PAN) coordinator that broadcasts a beacon, telling other devices on the network when they can send or receive data. That is, the beacon defines a superframe (or time slice) that can be shared by the devices on the network. Moreover, the IEEE 802.15.4 protocol defines any beaconed network with a PAN coordinator to be a star network, where all communications are required to be either transmitted to or from the PAN coordinator. In other words, all communications between devices within the network must be in effect routed through the PAN coordinator.

One disadvantage to the IEE 802.15.4 protocol is that the coordinator device must be involved in and active for every network transaction on the network. That is, for each transaction, the coordinator device designates the window of time during which particular devices can communicate, and then the communications between the particular devices are routed through the coordinator device during the designated window of time. However, in a network in which each device operates on battery power, having one of the devices perform the duties of the PAN coordinator device can quickly exhaust the power reserves of the designated device.

As such, one embodiment provides a communications protocol in which a coordinator device assigns time slices or guaranteed time slots (GTSs) to other devices within the network, but said coordinator device is otherwise not involved in the communications between the devices. In doing so, the data packets sent between the device may be modified to include both a source address and a destination address, and the GTSs can be allocated to a pair of devices authorized to communicate within the particular window of time (i.e., the source and destination devices). For example, a contention access period (CAP) could be designated, in which devices can transmit unsolicited MAC commands to the PAN coordinator. Examples of such commands include commands to leave the network, join the network, or requests for GTSs to transmit data to a peer. The PAN coordinator could then allocate GTSs to the devices, based on the commands received during the CAP. Doing so enables peer-to-peer communication between the devices, while allowing every other device within the network to enter a low-power mode until the time of the next beacon. Moreover, such a communications protocol allows devices to manage their own key lists, distributing the workload otherwise assigned to the PAN coordinator device.

For data transmissions spanning multiple beacon periods, the PAN coordinator may assign the entire available inter-beacon period (i.e., the period of time after the CAP) to the corresponding devices, for use in the data transmission between the devices. In doing so, the sender and receiver devices may have their radio in continuous active use, in order to maximize the transmission bandwidth. In the event another pair of devices requests to transmit a packet during the CAP, the PAN coordinator can divide the GTSs between the active devices, while attempting to keep the GTSs for the lengthier data transmissions together in order to maximize their transmission bandwidth. While the PAN coordinator still listens for requests during the CAP, the PAN coordinator can enter a low-power idle mode for the rest of the beacon period unless the PAN coordinator itself has a data transmission during one of more GTSs pending. Advantageously, doing so helps to minimize the power consumption of the PAN coordinator device, by allow the PAN coordinator device to enter a low-power mode more frequently relative to the IEEE 802.15.4 protocol.

Figure 13:
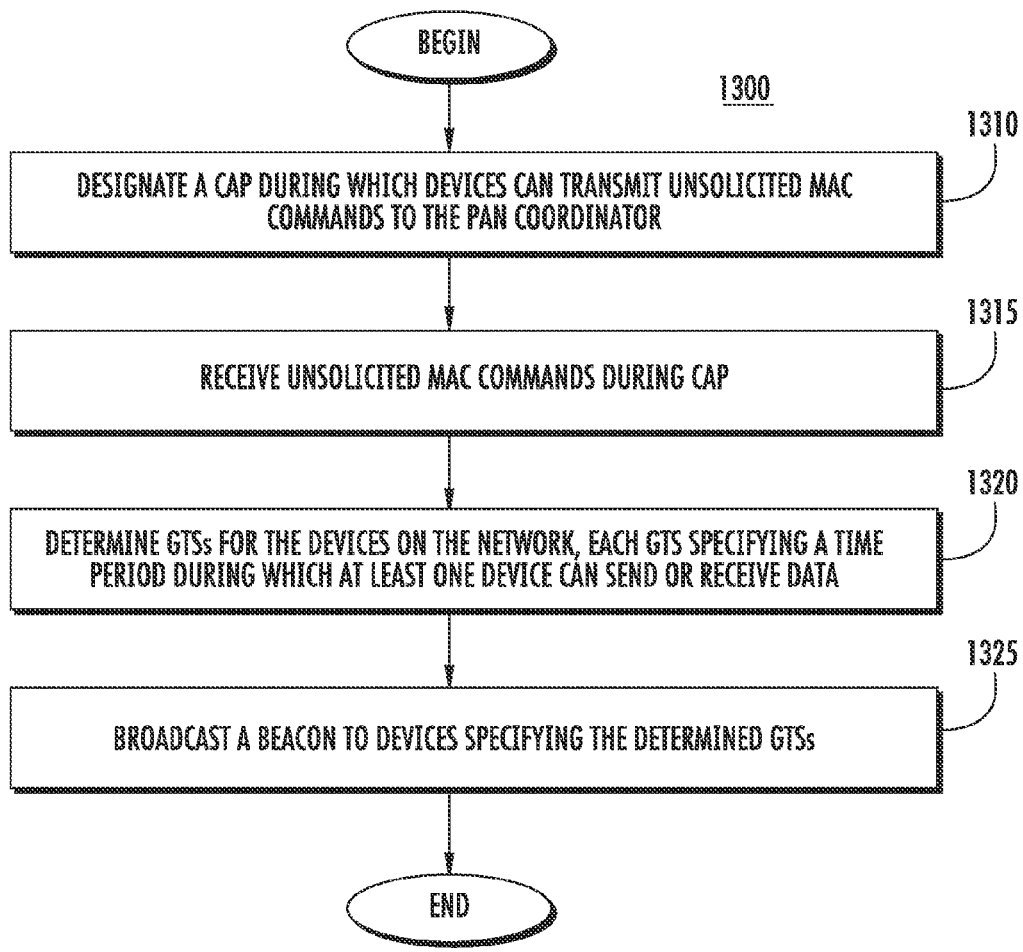
FIG. 13 is a flow diagram, illustrating a method of facilitating direct RF communications between devices using guaranteed time slots, according to one embodiment described herein.

FIG. 13 is a flow diagram, illustrating a method of facilitating direct RF communications between devices, according to one embodiment described herein. As shown, the method 1300 begins at block 1310, where a PAN coordinator device designates a CAP during which devices can transmit unsolicited MAC commands to the PAN coordinator. The PAN coordinator receives one or more MAC commands from various devices within the RF network during the CAP (block 1315). For example, one such MAC command received from a first device could specify an amount of data that the first device wishes to transmit to a second device within the RF network.

Once the CAP has elapsed, the PAN coordinator device determines GTSs for the devices within the network to use in performing the requested data transmissions specified in the received MAC commands (block 1320). Generally, each determined GTS specifies a unique period of time during which at least one of the devices within the network can transmit data to another device within the network. For example, a first GTS could be determined for source device $D_1$ and destination device $D_2$ from time $T_1$ until time $T_2$, while another GTS could be determined for source device $D_2$ and destination device $D_3$ from time $T_2$ until time $T_3$. To ensure that the devices within the network adhere consistently to the transmission schedule, each device can be configured with a respective clock that is synchronized with all of the other clocks within the network. By having the devices adhere to their assigned GTSs using synchronized clocks, embodiments ensure that only one pair of devices is transmitting via RF communications at any one moment in time.

Once the GTSs are determined, the PAN coordinator broadcasts a beacon specifying the time schedule including all of the determined GTSs (block 1325) and the method 1300 ends. Each device within the network may receive the beacon and, if the respective device is assigned one or more GTSs for the upcoming transmission window, the device can configure itself to send or receive data (as specified by the beacon) during the assigned GTS. The devices may be configured to remain in a power saving mode (e.g., disabling RF communications) during the remaining time periods within the transmission window, and devices that are not assigned any GTSs during the transmission window may remain in the power saving mode throughout the entire window. Doing so allows the devices to conserve battery power without affecting the data transmissions between the devices.

Moreover, during each assigned GTS, the designated source device may transmit directly to the designated destination device(s). Thus, in contrast to the IEEE 802.15.4 protocol where the devices communicate with one another through the PAN coordinator as a proxy, embodiments enable the devices within the RF network to communicate directly with one another during their assigned GTSs without the involvement of the PAN coordinator. Doing so allows the PAN coordinator to enter a power saving mode during this time, thereby allowing the PAN coordinator device to better conserve its battery power. Of note, during a transmission window where the PAN coordinator device is designated as a source device or a destination device for a GTS(s), the PAN coordinator device can exit the power saving mode during the GTS(s) in order to transmit or receive data (as appropriate). Such an embodiment is particularly advantageous, for example, where all devices within the RF communications network operate on battery power, as embodiments allow the PAN coordinator to remain in a power saving mode more frequently than traditional techniques allow (e.g., the IEEE 802.15.4 protocol).

Figure 14:
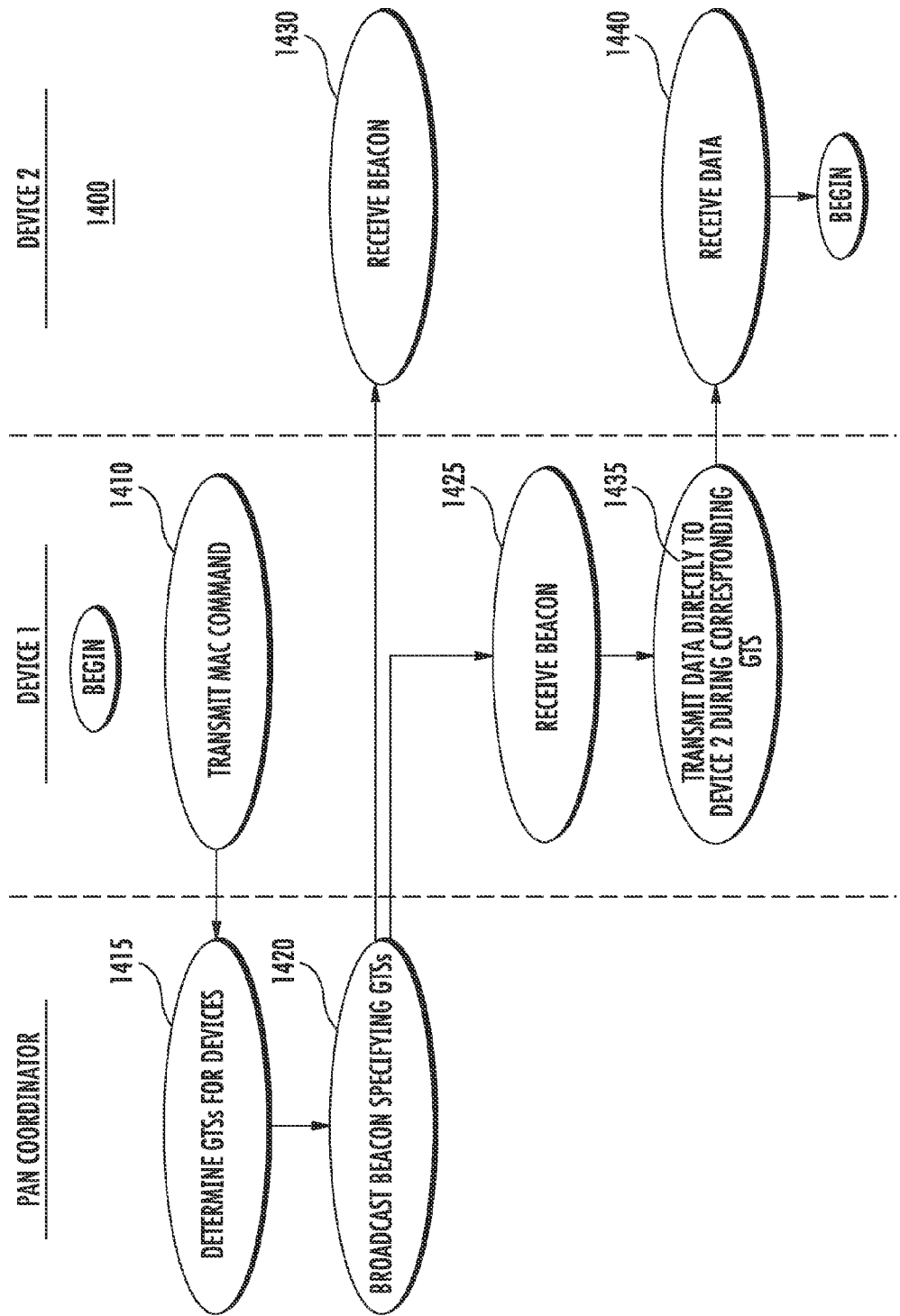
FIG. 14 is a flow diagram, illustrating a method of facilitating direct RF communications between a first device and a second device, according to one embodiment described herein.

FIG. 14 is a flow diagram, illustrating a method of facilitating direct RF communications between devices, according to one embodiment described herein. As shown, the method 1400 begins at block 1410, where a first device transmits a MAC command requesting a time slot(s) for use in transmitting data from the first device to a second device. In one embodiment, the command can further specify an amount of data to be transferred, which can be used by the PAN coordinator in determining how many time slots to assign to the first device's data transmission to the second device. In an alternate embodiment, the command can specify a requested number of time slots to assign to the first device's data transmission to the second device.

The PAN coordinator receives the MAC command from the first device and upon expiration of the CAP, the PAN coordinator determines how to allocate available GTSs to the devices within the RF network (block 1415). For instance, if the PAN coordinator determines that multiple GTSs are needed to complete the data transmission between the first device and the second device, the PAN coordinator could attempt to assign a requisite number of consecutive GTSs to the first device and second device during the upcoming inter-beacon period. Doing so allows the devices to maximize their transmission bandwidth through the use of one continuous data transmission and allows the device to return to a power saving mode during GTSs assigned to other devices. Moreover, for data transmissions spanning multiple beacon periods, the PAN coordinator may assign the entire available inter-beacon period (i.e., the period of time after the CAP) to the corresponding devices, for use in the data transmission between the devices. In doing so, the sender and receiver devices may have their radio in continuous active use, in order to maximize the transmission bandwidth.

Once the GTSs for the upcoming inter-beacon period are determined, the PAN coordinator broadcasts a beacon specifying the determined GTSs to the various devices in the RF network (block 1420). As shown, both the first device and the second device receive the broadcasted beacon specifying the GTS information (blocks 1425 and 1430). The first device then transmits data directly to the second device during the GTS(s) assigned by the PAN coordinator to the data transmission (block 1435). Although not shown, the second device may also leave a power saving mode at this point in time and begin listening for RF data transmissions, based on the GTS information specified in the broadcast beacon. The second device receives the data directly from the first device (block 1440) and the method 1400 ends. Additionally, once the first device and second device complete their data transmission, the first and second device may return to a power saving mode (e.g., by disabling their RF transceivers) e.g., until their next scheduled GTS or the time of the next CAP during which the devices need to broadcast a MAC command to request a window of time for performing another data transmission.

Of note, while the PAN coordinator may still listen for requests during the CAP, the PAN coordinator can enter a low-power idle mode for the rest of the beacon period unless the PAN coordinator itself has a data transmission during one of more GTSs pending. Thus, the PAN coordinator may remain in a power saving mode during blocks 1435 and 1440 in the depicted method 1400, as the first device transmits the data directly to the second device without requiring further action or involvement on behalf of the PAN coordinator. Advantageously, doing so helps to minimize the power consumption of the PAN coordinator device, by allowing the PAN coordinator device to enter a low-power mode more frequently relative to other techniques (e.g., the IEEE 802.15.4 protocol).

Technical Description

Figure 15:
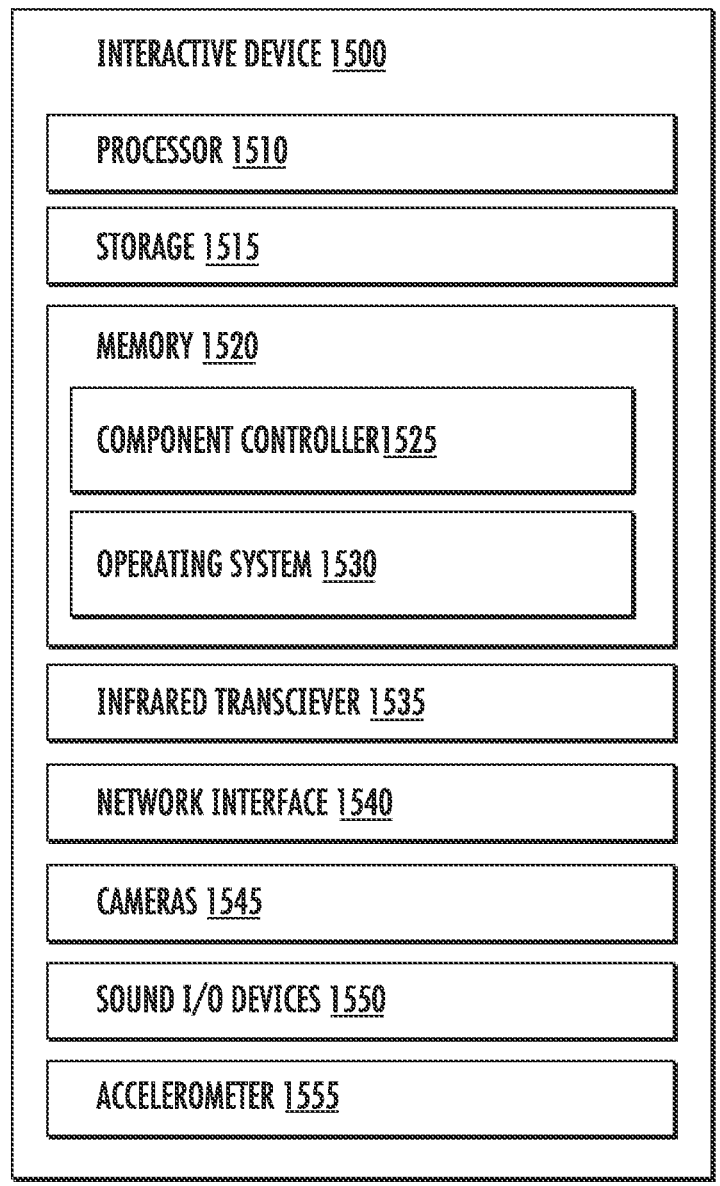
FIG. 15 is a block diagram illustrating a system configured with a control component, according to one embodiment described herein.

An example of an interactive device is shown in FIG. 15, which is a block diagram illustrating an interactive device configured with a controller component, according to one embodiment described herein. In this example, the device 1500 includes, without limitation, a processor 1510, storage 1515, memory 1520, an infrared transceiver 1535, a network interface 1540, camera devices 1545, sound I/O devices 1550 and an accelerometer device 1555. Generally, the processor 1510 retrieves and executes programming instructions stored in the memory 1520. Processor 1510 is included to be representative of a single CPU, multiple CPUs, a single CPU having multiple processing cores, GPUs having multiple execution paths, and the like. The memory 1520 is generally included to be representative of a random access memory. The network interface 1540 enables the controller component 1525 to connect to a data communications network (e.g., wired Ethernet connection or an 802.11 wireless network).

Further, while the depicted embodiment illustrates the components of a particular interactive device, one of ordinary skill in the art will recognize that interactive devices may use a variety of different hardware architectures. For instance, in one embodiment the controller component logic is implemented as hardware logic. Examples of such hardware logic include, without limitation, an application-specific integrated circuit (ASIC) and a field-programmable gate array (FPGA). Moreover, it is explicitly contemplated that embodiments may be implemented using any device or computer system capable of performing the functions described herein.

Returning to the embodiment depicted in FIG. 15, the memory 1520 represents any memory sufficiently large to hold the necessary programs and data structures. Memory 1520 could be one or a combination of memory devices, including Random Access Memory, nonvolatile or backup memory (e.g., programmable or Flash memories, read-only memories, etc.). In addition, memory 1520 and storage 1515 may be considered to include memory physically located elsewhere; for example, on another computer communicatively coupled to the interactive device 150. Illustratively, the memory 1520 includes a controller component 1525 and an operating system 1530. The operating system 1530 generally controls the execution of application programs on the interactive device 1500. Examples of operating system 1530 include UNIX, a version of the Microsoft Windows® operating system, and distributions of the Linux® operating system. Additional examples of operating system 1530 include custom operating systems for gaming consoles, including the custom operating systems for systems such as the Nintendo DS® and Sony PSP®.

The infrared transceiver 1535 represents any device capable of sending and receiving infrared signals. In another embodiment, a device 1500 that only sends or receives infrared signals may be configured with an infrared transmitter or a infrared receiver, respectively, as opposed to the infrared transceiver 1535. The sound I/O devices 1550 could include devices such as microphones and speakers. For example, the speakers could be used to produce sound effects (e.g., explosion sound effects, dialogue, etc.) and/or to produce vibration effects.

Generally, the controller component 1525 provides logic for the interactive device 1500. For example, the controller component 1525 could be configured to detect that a coded infrared signal has been received (e.g., using the infrared transceiver 1535). The controller component 1525 could then determine a type of the infrared signal (e.g., based on data specified within the coded infrared signal) and could determine a corresponding response based on the determined type. For example, the controller component 1525 could determine that the infrared signal corresponds to a repulsor ray blast (e.g., from the Iron Man® action figure) and, in response, could increment a counter of received repulsor ray blasts. Additionally, the controller component 1525 could perform a corresponding action based on the counter. For example, if the controller component 1525 determines that the detected repulsor ray blast is the first blast received, the controller component 1525 could output a roaring sound effect (e.g., using a speaker 1550) and could manipulate a servomechanism on the device 1500 to produce a rocking effect (e.g., by rotating an arm positioned in the base of the device 1500 slightly). As another example, if the controller component 1525 determines that the repulsor ray blast was the fifth blast received, the controller component 1525 could output a groaning sound effect (e.g., using speaker 1550) and could manipulate the servomechanism such that the device 1500 falls over (e.g., by rotating a lever until the device 1500 falls over).

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

Additional examples of storytelling devices and story management and creation techniques, as well as proximity detection techniques and communication protocols, are provided in the attached appendices.

While the foregoing is directed to embodiments of the present invention, other and further embodiments of the invention may be devised without departing from the basic scope thereof, and the scope thereof is determined by the claims that follow.

What is claimed is:

1. A method, comprising:
designating, at a personal area network (PAN) coordinator, a contention access period (CAP) during which a plurality of devices on a network can transmit unsolicited media access control (MAC) commands to the PAN coordinator via radio frequency (RF) communications; and
facilitating direct RF communication between the plurality of devices, by broadcasting a beacon, at the PAN coordinator, designating guaranteed time slots (GTSs) for the plurality of devices, wherein each GTS specifies a time period during which one of the plurality of devices on the network is authorized to send or receive data, wherein the PAN coordinator is configured to actively listen for requests during the CAP, and wherein the PAN coordinator is configured to enter a low-power idle mode for a remaining inter-beacon period after the CAP and before a next beacon broadcast unless the PAN coordinator has a data transmission during one of more GTSs pending within the inter-beacon period, thereby minimizing the power consumption of the PAN coordinator device.

2. The method of claim 1, wherein a first one of the plurality of devices is configured to enter the low-power mode until a designated time of the next beacon broadcast, upon expiration of the designated GTS for the first device.

3. The method of claim 1, wherein a first one of the plurality of devices is configured to enter the low-power mode until a designated time of the next beacon broadcast upon determining that no GTS was assigned for the first device.

4. The method of claim 1, wherein each of the plurality of devices is configured to manage a respective key list specifying keys corresponding to the other devices in the plurality of devices.

5. The method of claim 1, wherein the beacon is broadcast according to the IEEE 802.15.4 protocol.

6. The method of claim 5, wherein data packets sent between the devices in the plurality of devices specify both a source address and a destination address.

7. The method of claim 6, wherein each of the GTSs designated within the beacon specifies a respective pair of devices that are authorized to communicate within the particular window of time.

8. The method of claim 1, wherein facilitating direct RF communication between the plurality of devices, by broadcasting a beacon, at the PAN coordinator, designating guaranteed time slots (GTSs) for the plurality of devices further comprises:
determining that a first data transmission between a first device and a second device of the plurality of devices spans multiple beacon periods;
assigning the remaining inter-beacon period of time after the CAP and before the next beacon broadcast, to the first and second devices, for use in performing the first data transmission.

9. The method of claim 8, wherein the first and second devices transmit data continuously during the inter-beacon period of time, thereby maximizing the transmission bandwidth between the first and second devices.

10. The method of claim 1, wherein facilitating direct RF communication between the plurality of devices, by broadcasting a beacon, at the PAN coordinator, designating guaranteed time slots (GTSs) for the plurality of devices further comprises:
determining that two or more pairs of devices from the plurality of devices have requested to transmit data packets during the CAP; and
dividing the GTSs between the requesting two or more pairs of devices, while keeping the GTSs for the lengthier data transmissions continuous in order to maximize the transmission bandwidth of the data transmissions.

11. A non-transitory computer-readable medium containing logic that, when executed, performs an operation comprising:
designating, at a personal area network (PAN) coordinator, a contention access period (CAP) during which a plurality of devices on a network can transmit unsolicited media access control (MAC) commands to the PAN coordinator via radio frequency (RF) communications; and
facilitating direct RF communication between the plurality of devices, by broadcasting a beacon, at the PAN coordinator, designating guaranteed time slots (GTSs) for the plurality of devices, wherein each GTS specifies a time period during which one of the plurality of devices on the network is authorized to send or receive data, wherein the PAN coordinator is configured to actively listen for requests during the CAP, and wherein the PAN coordinator is configured to enter a low-power idle mode for a remaining inter-beacon period after the CAP and before a next beacon broadcast unless the PAN coordinator has a data transmission during one of more GTSs pending within the inter-beacon period, thereby minimizing the power consumption of the PAN coordinator device.

12. The non-transitory computer-readable medium of claim 11, wherein a first one of the plurality of devices is configured to enter the low-power mode until a designated time of the next beacon broadcast, upon expiration of the designated GTS for the first device.

13. The non-transitory computer-readable medium of claim 11 wherein a first one of the plurality of devices is configured to enter the low-power mode until a designated time of the next beacon broadcast upon determining that no GTS was assigned for the first device.

14. The non-transitory computer-readable medium of claim 11, wherein each of the plurality of devices is configured to manage a respective key list specifying keys corresponding to the other devices in the plurality of devices.

15. The non-transitory computer-readable medium of claim 11, wherein the beacon is broadcast according to the IEEE 802.15.4 protocol.

16. The non-transitory computer-readable medium of claim 15, wherein data packets sent between the devices in the plurality of devices specify both a source address and a destination address.

17. The non-transitory computer-readable medium of claim 16, wherein each of the GTSs designated within the beacon specifies a respective pair of devices that are authorized to communicate within the particular window of time.

18. The non-transitory computer-readable medium of claim 12, wherein facilitating direct RF communication between the plurality of devices, by broadcasting a beacon, at the PAN coordinator, designating guaranteed time slots (GTSs) for the plurality of devices further comprises:
   determining that a first data transmission between a first device and a second device of the plurality of devices spans multiple beacon periods;
   assigning the remaining inter-beacon period of time after the CAP and before the next beacon broadcast, to the first and second devices, for use in performing the first data transmission, wherein the first and second devices transmit data continuously during the inter-beacon period of time, thereby maximizing the transmission bandwidth between the first and second devices.

19. A personal area network (PAN) coordinator device for a network, comprising:
   a radio frequency (RF) communications transceiver;
   logic configured to designate a contention access period (CAP) during which a plurality of devices on the network can transmit unsolicited media access control (MAC) commands to the PAN coordinator via radio frequency (RF) communications; and
   logic configured to facilitate direct RF communication between the plurality of devices, by broadcasting a beacon, using the RF communications transceiver, designating guaranteed time slots (GTSs) for the plurality of devices, wherein each GTS specifies a time period during which one of the plurality of devices on the network is authorized to send or receive data, wherein the PAN coordinator is configured to actively listen for requests during the CAP, and wherein the PAN coordinator is configured to enter a low-power idle mode for a remaining inter-beacon period after the CAP and before a next beacon broadcast unless the PAN coordinator has a data transmission during one of more GTSs pending within the inter-beacon period, thereby minimizing the power consumption of the PAN coordinator device.

* * * * *